United States Patent [19]
Lehto

[11] Patent Number: 5,203,161
[45] Date of Patent: Apr. 20, 1993

[54] METHOD AND ARRANGEMENT FOR COOLING AIR TO GAS TURBINE INLET

[76] Inventor: John M. Lehto, Rte. 2, Box 119B, Cokato, Minn. 55321

[21] Appl. No.: 605,743

[22] Filed: Oct. 30, 1990

[51] Int. Cl.$^5$ .............................................. F02C 7/04
[52] U.S. Cl. ...................................... 60/39.53; 55/21
[58] Field of Search ............... 60/39.53, 728, 39.02; 55/21, 39, 221

[56] References Cited

U.S. PATENT DOCUMENTS

| | | | |
|---|---|---|---|
| 2,143,007 | 1/1939 | Heath et al. | 55/29 |
| 2,336,674 | 12/1943 | Crawford | 55/221 |
| 2,678,531 | 5/1954 | Miller | 60/39.53 |
| 3,796,045 | 3/1974 | Foster et al. | 60/728 |
| 3,978,663 | 9/1976 | Mandrin et al. | 60/728 |
| 4,307,519 | 12/1981 | Szücs et al. | 55/221 |

FOREIGN PATENT DOCUMENTS

| | | | |
|---|---|---|---|
| 54-71213 | 7/1979 | Japan | 60/728 |
| 56-27034 | 3/1981 | Japan | 60/728 |

Primary Examiner—Richard A. Bertsch
Assistant Examiner—Charles Freay
Attorney, Agent, or Firm—Merchant, Gould, Smith, Edell, Welter & Schmidt

[57] ABSTRACT

A method and arrangement for providing air to a gas turbine inlet, to facilitate energy production, are provided. In general, preferred methods involve both cooling air to be delivered to the gas turbine inlet, and also reducing the humidity content thereof. Preferred apparatus to accomplish the methods include: a water spray cooling arrangement; a liquid desiccant contactor; and, a vapor compression chiller arrangement. Preferably, cold solutions for operation of the water spray cooler and the liquid desiccant contactor are provided via absorption chiller arrangements.

10 Claims, 15 Drawing Sheets

METHOD AND ARRANGEMENT FOR COOLING AIR TO GAS TURBINE INLET

FIELD OF THE INVENTION

The present invention relates to gas turbine operation, particularly in power production. The invention more specifically concerns the cooling of inlet gases to gas turbines, for increased efficiency of power production.

BACKGROUND OF THE INVENTION

Gas turbine arrangements are widely utilized for the production of electrical power. Such arrangements generally involve: a compressor, which takes ambient air and compresses it to about 15-20 bar, increasing the temperature to about 600-700° F. (315-371° C.); a burner, through which the compressed air passes, which increases the temperature of the gases to at least about 2000-2200° F. (1080-1190° C.); and, an expander, in which the gases are expanded to about ambient pressure with a typical temperature reduction to about 1000° F. (540° C.). Energy released during the expansion process is used to drive a generator, for production of power.

Typical gas turbine arrangements are rated for percent of design output, percent of design air flow and percent of design heat rate, vs. compressor inlet temperature. This is exemplified in FIG. 1, which reflects such plots for a General Electric model MS7001 turbine, a gas turbine rated for 145,400 KW (145 megawatt) output at 100% design output.

Upon examination of FIG. 1, it will be understood that the gas turbine involved is rated for 100% design output at compressor inlet (air) temperatures of about 59° F. (15° C.). As the gas temperature (inlet temperature) increases above 59° F. (15° C.), output, i.e. energy production, drops off rapidly, for example to a figure of about 90% of the rated value at about 84° F. (29° C.), and only about 84% output at 100° F. (38° C.). On the other hand, energy production is favored by inlet air temperatures below 59° F. (15° C.). It is noted that there is a linear or nearly linear relationship between energy production, i.e. percent of design output, and compressor inlet air temperature, over the temperature range shown.

It is also noted that there is also a linear or nearly linear relationship between percent of design air flow, i.e. volume of air passing through the turbine for a given percent design output, and temperature of compressor inlet air. As the compressor inlet air temperature is increased, percent of design air flow decreases. Alternatively stated, output requires a decrease in air flow, as air temperature increases. A General Electric MS7001 is rated for an air flow of about 3,255,000 lb of air/hr at 100% design air flow.

Further, there is a linear or nearly linear relationship between percent of design heat rate, and compressor inlet air temperature. As the compressor inlet air temperature is increased, the percent of design heat rate increases. This figure can be directly related to the amount of fuel or energy needed in the burner, to appropriately increase the temperature of the gases, for use in the gas turbine. A plot of percent design heat consumption versus inlet temperature is also provided.

FIG. 1 exemplifies a well known and widely observed phenomenon in industries utilizing gas turbines for power production, the particular turbine presented merely being an example. The General Electric MS7001 turbine was selected, since it is one of the newest, most efficient, designs available. As with any conventional turbine, as the ambient temperature increases, power output from the arrangement decreases. This means that the power production for such systems can be expected to vary, seasonally, with wide swings in ambient air temperature. Efficiency is substantially decreased if the ambient air, channeled to the turbine inlet, is hot. In many instances as much as a 30% decrease in maximum of power production occurs just through a swing of ambient temperature from about 30° to 90° F. (−1° to 32° C.).

SUMMARY OF THE INVENTION

According to the present invention there is provided a method and arrangement for cooling air to gas turbine inlets, to facilitate power production. A variety of specific arrangements are illustrated, each useable to provide advantage for certain applications. In certain preferred applications the inlet air to the gas turbine is cooled as low as reasonably possible without water condensation problems. For such applications, preferably cooling is to less than about 55° F. (13° C.) and preferably to no more than about 40° F. (1-3° C.), more preferably to no more than about 20° F. (−7° C.), and most preferably to no more than about 5° F. (−15° C.). In certain applications, the ambient air may not be cooled to as great an extent as stated in the previous sentence for more preferred systems, but it is otherwise modified to improve turbine operation, as described. In particular, it may be preferably treated for water content.

Methods of Cooling Air

At the present time, with conventional technology and equipment, there are basically three general methods available for the cooling of air. These systems have generally been utilized for air conditioning or refrigeration systems, and have not, in general, been adapted to cool high volume air streams to gas turbine arrangements according to the preferred methods described herein. It may at least be speculated that each of the three systems might be utilizable in application to generate cooled air at a gas turbine inlet. The three general methods are: (1) evaporative cooling; (2) vapor compression refrigeration; and, (3) absorption chillers.

1. Evaporative Cooling

Evaporative cooling technology is one of the earlier methods developed for cooling air. In general, the technique involves evaporation of water (or other fluid) into the air. Energy (i.e. heat in the air) is taken up by the evaporation process (i.e. in the heat of vaporization of the fluid), with the net effect being a cooling of the air. This technology is applied, for example, in "swamp boxes" used as air conditioners in arid and semi-arid climates.

As a technology to be applied to gas turbine arrangements, direct application of evaporative cooling by itself does not present a widely acceptable possibility. First, it would not be expected to work very well in a relatively humid climates. Secondly, it involves the addition of water vapor to the air passing through the turbine, which can decrease power input. Thirdly, the air cannot be cooled to much below about 60° F. (16° C.) via the technique. Also, the technique increases risks of water condensation on the equipment surfaces in the gas turbine.

The latter three points of the previous paragraph are worthy of further evaluation. In general, if the method of air cooling utilized involves addition of fluid vapor (water) thereto, with cooling occurring through the evaporation process, it follows that the air being cooled is having its percent relative moisture content (relative humidity) increased. If the process is conducted to a sufficient extent, the air will become saturated in the added fluid vapor. In general, it is undesirable to direct saturated air through equipment such as the compressor of a gas turbine system. Reasons for this include the fact that as the air enters the equipment, its flow rate may change, resulting in a slight temperature decrease. Should the temperature of water saturated air decrease, for example, moisture will condense therefrom and damage by impaction internal portions of the equipment.

In addition, as previously explained, even if cooled as far as possible, i.e. with water added up to saturation, evaporative techniques generally cannot be practically utilized to cool hot air to a very great extent. Also, if the technique is even further limited by merely adding enough water to achieve some evaporative cooling, without reaching a point of saturation, the overall cooling effect is even more limited.

2. Vapor Compression Refrigeration

Vapor compression chillers are refrigerators, and have been applied in a wide variety of systems. These include, for example, household air conditioners. Cooling is accomplished by placing cooling coils in the path of the gas (air) stream to be cooled. A cooled liquid is pumped through the cooling coils, for heat exchange with the air. A pump is utilized to drive the chilled liquid through the heating (i.e. heat exchange) coils. The liquid is chilled through utilization of a vapor compression chiller, which involves use of a compressed refrigerant within a circulating system. A compressor is needed, to maintain appropriate compression of the refrigerant. The chilled fluid may be water, an aqueous mix (for example a water/alcohol or water/glycol mix), etc.

There are substantial problems with the adaption of vapor compression technology to directly cool air inlet to gas turbines. It can be expected that a substantial amount of the increased power production that would result from the cooled air would be needed to drive the chiller with its large compressor, especially if a 90° F. to 37° F. (32° to 3° C.) drop (or more) in temperature were intended. In addition, capital costs associated with the setting up of the vapor compression chiller arrangement sufficient to handle a large volume or flow rate of air would be expected to be substantial. A typical gas turbine system for power production would be expected to operate with air flow at no less than about 600,000 pounds of air per hour (272,400 kg/hr), and in many instances much more (3 to 6 times as much, for example).

Since much of the extra power obtained would need to be spent in generating the cooling, such a system would not be expected to be practical unless the added power produced has a relatively high value. For example, such technology might be practically applied if off peak (lower value) electricity could be utilized to run the compressor and the vapor compression chiller, to cool a reservoir of cooling water for the cooling coils, stored for later use. Cooled water from the reservoir could later be utilized to cool air and increase power production, during peak periods. If the value of the power during the peak periods was sufficiently high, relative to the value of the excess power utilized in generating more power at the off-peak periods, the system would be justifiable. At the present time, however, with the present economics of power production, such a system (in and of itself) would not be practical in wide use, as a method of modifying air directed to a turbine inlet.

3. Absorption Chiller

A third type of technology utilized in industry for cooling air streams is absorption chiller technology. For a typical absorption chiller arrangement, a steam line is used to drive the chiller. The refrigerator does not need a large compressor, but rather only a relatively small, lower power, circulation pump is needed to operate the system. The system, in general, utilizes a mixture of solvent and salt to advantage. For example, in some such systems an aqueous solution of lithium bromide is used to rapidly absorb moisture for a large volume having a circulating fluid coil therein. The absorption helps reduce pressure in the volume. The temperature in the cooling coil reduces, since the reduced pressure assists in vaporization of moisture on the exterior of the coil. Fluid inside of the cooling coil can be circulated through a heat transfer coil to cool air passing into a system.

A conventional technology absorption chiller arrangement, for cooling gases for a turbine from $+90°$ F. ($+32°$ C.) to no more than about 42° F., would need to be very large and would generally only be utilizable when a relatively inexpensive source of steam is available. For example, the arrangement might be utilized in a combined cycle system wherein hot off-gases from that gas turbine are eventually fed through a boiler arrangement or heat recovery unit, to generate steam. If the gas turbine arrangement involved does not have, downstream therefrom, a heat recovery unit, a relatively high capital cost would be associated with adaption of an absorption chiller system such as that described.

Very recently there have been developed direct fired absorption chillers. Such arrangements generally use a burner or gas flame to heat the $H_2O/LiBr$ solution. If such a system were directly applied for cooling of a gas turbine arrangement, however, additional costs associated with the maintenance of the chiller would need to be substantially more than off-set by the increased power production resulting from the cooling, in order for the arrangement to be justified.

Another problem with absorption chillers is that they are limited in the extent to which they can generate cooling. A typical, conventional, absorption chiller cannot cool a circulating fluid to lower than about 42° F. (6° C.). The extent to which the circulating fluid can be used to cool an air flow stream, will depend upon the specifics of the system; however, typically a 42° F. (6° C.) fluid stream could not be practically used to cool a substantial air stream to much below about 50° F. (10° C.).

Problems from Moisture Content

From review of FIG. 1, it will be apparent that with respect to obtaining improved efficiency of the generator, it is preferred to cool the air entering the compressor for the gas turbine arrangement as far as reasonably possible. A problem with this is that, in general, as air is cooled, its capacity to retain moisture reduces. This leads to several problems. Certain of problems will be understood from the following descriptions, and reference to FIG. 2. FIG. 2 is a psychrometric chart for normal temperatures, and a barometric pressure of 29.92" (760 mm) of mercury (basically atmospheric pressure). Among other things, such a standard chart can be utilized to determine the saturation temperature for a given content of moisture in the air. The saturation temperature (100% relative humidity) for a given moisture content can be read along curved line A. For example, at a temperature of about 70° F. (21° C.), and a barometric pressure 29.92" (760 mm) of mercury, saturated air holds about 110 grains of moisture per pound of dry air. (For purposes of conversion, 7,000 grains equals about 1 pound or 454 grams of moisture.) If the air at 70° F. (21° C.) has about a 70% relative humidity, the chart can be used to locate the moisture content, i.e. about 76 grains of moisture per pound of dry air. Tables such as the one shown in FIG. 2 are widely utilized for evaluating heat content (enthalpy) and moisture content (humidity) of air, at various temperatures. The chart can be utilized to help understand some of the problems and concerns of the present invention.

For example, consider air having a dry bulb temperature of about 95° F. (35° C.) and a relative humidity of about 65%. This is the type of air that might be encountered on a hot day in humid portions of this country, for example along the Caribbean coast or portions of the Eastern seaboard. If the air is cooled downwardly from 95° F. (35° C.), unless the moisture content (absolute value in wt. H₂O/wt. air) is reduced the air will be saturated at about 81° F. (27° C.), see FIG. 2. Further cooling (below about 81° F. or 27° C.) would require substantial energy, involved in overcoming the heat of vaporization of water, to achieve condensation. That is, further cooling would be associated with water condensation, and taking enough energy out of the air to achieve condensation would require putting more energy into the cooler system.

Also, regardless of the method of cooling applied, if the 95° F. (35° C.), 65% relative humidity, air were cooled downwardly toward about 35° F. (1°-2° C.), at some point in the cooling, saturation will have been achieved. That is, it could be expected that the relatively cold air generated, for example about 35°-37° F. (1°-3° C.), would be saturated or nearly saturated. If the saturated air is then passed into a typical compressor, with air flow change, problems with condensation could result. This could occur, for example, through passage of the air through a restrictive orifice, with a concomitant air flow increase. Decreases in temperature that would result from directing the air into portions of the compressor equipment such that air flow is increased (Bernoulli effect), would be expected to result in even further condensations within the compressor itself. Again, this could result in damaging moisture and/or ice formation in the compressor, and impaction on compressor components.

In general, it will be preferred to direct into the compressor system, of a gas turbine arrangement, air having a water content such that if the air temperature were decreased by less than about 5° F. (about 2°-3° C.), it would not be saturated. Alternately stated, preferably the air directed into the gas turbine arrangement has a water content such that if the air temperature is dropped (without dehumidification) by anything less than about 5° F. (2°-3° C.), saturation is not achieved.

This definition may be further understood by reference to the psychrometric chart of FIG. 2. Assume, for example, that it is intended to direct air into the gas turbine arrangement, for compression, at a temperature of about 35° F. (1°-2° C.). The desired maximum of moisture content can be readily calculated as follows. The temperature 5° F. lower than 35° F. is, of course, 30° F. Saturated air at 30° F. contains about 25 grains of moisture per pound dry air. At 35° F., a moisture content of 25 grains per pound dry air corresponds to relative humidity of about 80%. Thus, following the above indicated preferred definition of the humidity content of air delivered to a gas turbine at about 35° F., preferably the air has no greater than about 80% relative humidity.

It is foreseen that for typical applications of the present invention, wherein the preferred temperature of air directed into the gas turbine arrangement is no greater than about 40° F. (4° C.), is preferably no greater than about 20° F. (−7° C.), and most preferably is no greater than about 5° F. (−15° C.), the moisture content of the air preferably delivered to the compressor, can be alternatively stated with respect to relative humidity content. For air within the temperature range of about 5–40° F. (−15° to 4° C.), preferably a relative humidity of no greater than about 60–80% is used. That is, a relative humidity of about 20–40% less than saturated will generally ensure that operations conducted within the gas turbine arrangement will not be associated with substantial moisture condensation or freeze problems. Again, the psychometric chart can be used to calculate preferred relative humidities.

It will be apparent from the following discussions, that preferred methods of the present invention include steps of dehumidifying air in association with steps of cooling air, prior to introduction of the air into a gas turbine arrangement, to achieve advantage. It is foreseen that in at least some instances, cooling without dehumidification may have advantage. It is foreseen that in certain other applications, dehumidification without substantial cooling may provide advantage. However, a typical preferred application of the present invention will include application of both steps, in a preferred manner. This will be apparent from certain detailed descriptions provided herein below.

Preferred Air Cooled Gas Turbine Arrangements and Methods According to the Present Invention By appropriate application of the above-described technology, according to the present invention there is achieved preferred power production due to utilization of cooled inlet gases to gas turbine arrangements. Herein certain preferred, advantageous, applications of the invention are described. They include: direct application of a hot water or steam driven chiller to cool a fluid transfer through a cooling coil, for air inlet gases; application of a direct fired absorption chiller system operated with exhaust gases from the turbine; a hybrid system utilizing direct fired absorption to cool the gases to a first temperature, supplemented with a vapor compression system to cool the gases to a second lower temperature; a hybrid system utilizing a steam heated absorption chiller to cool to a first temperature, supported by a vapor compression chiller system to cool the already chilled gases to a second lower temperature; and, a system in which cold fluid spray is used to both reduce temperature and humidity. Each of these types of systems will be described in detail, herein below. Herein the term "direct application" and variants thereof in this context is meant to refer to systems in which cooling is accomplished through use of a chiller coil with fluid therein cooled by the chiller identified. That is, in which inlet air is cooled through use of a heat transfer fluid circulating within a cooling coil. Other arrangements are described herein.

In certain more preferred applications of the present invention, an above described system is utilized with an upstream dehumidifier system, prior to air cooling by the chiller, to advantage. Most preferably, upstream of the dehumidifier, a water spray cooler is used, to lower the air temperature a preferred amount and in a preferred manner.

In general, according to the present invention a method is provided for providing relatively efficient operation of a gas turbine power generator system including an air compressor arrangement. The method generally includes a step of providing an air flow stream to the air compressor at a first temperature of no greater than about 55° F. (13° C.), more preferably no greater than about 40° F. (4° C.), typically no greater the freezing point of water and preferably no greater than about 20° F. (−7° C.), and most preferably below no greater than about 5° F. (−15° C.); and, at a relative humidity such that a moisture content of the air and the air flow stream has a first level which is no greater than an amount corresponding to saturation at a temperature of about 5° F. (about 3° C.) lower than the first temperature, the level of moisture content being measured in terms of weight of water per unit volume or weight of air. In general, preferred methods according to the present invention are applied by providing the air flow stream from ambient air having humidity content greater than the first level, and typically a temperature greater than about 55° F. (13° C.) and most typically greater than about 70° F. (21° C.).

Preferred methods according to the present invention involve a step of reducing the moisture content of an air stream by spraying an aqueous desiccant solution therein and separating the resulting mixture into a liquid phase and a resulting gas phase. The liquid phase is drawn off, and the resulting gas phase is provided, as a result of the application of the liquid desiccant, in a reduced humidity condition. Preferably, the liquid desiccant is provided as a cold solution, chilled by means of an absorption chiller arrangement.

In certain preferred applications, the step of moisture reduction (through application of a cold liquid desiccant solution) is conducted upon an air flow stream comprising a stream of ambient air which has previously been cooled, preferably by means of passage through a heat exchange chiller arrangement. Most preferably, the heat exchange chiller arrangement (utilized upstream from, but in air flow series with, the step of aqueous desiccant application) is an arrangement chilled by means of an absorption chiller arrangement. Herein the term "series" or "air flow series" in this context is meant to refer to arrangements, or methods, conducted upon an air stream at different points or times in the air flow, for example an upstream process and a later, downstream, process are in series.

In certain preferred applications, wherein the final air temperature is provided at below 40° F. (3°–4° C.), and preferably below freezing, the air temperature is further reduced after the step of treatment with liquid desiccant solution. In one preferred system this is conducted by passage through a chiller arrangement operated by means of a vapor compression chiller. In an alternate system, a very cold spray of liquid desiccant is used to accomplish the reduction.

The present invention also includes within its scope systems or arrangements for conduction of the above method or process steps on air directed into a gas turbine power generation system and including an air compressor arrangement therein. A variety of such means are described in detail herein.

DETAILED DESCRIPTION OF THE INVENTION

As required, detailed descriptions of applications of the present invention are provided herein. It is noted that the specific details illustrated and described herein are intended to be exemplary only, of the general principles of the invention. The invention may be applied in a variety of manners and forms, to yield advantages described herein.

Figure 3:
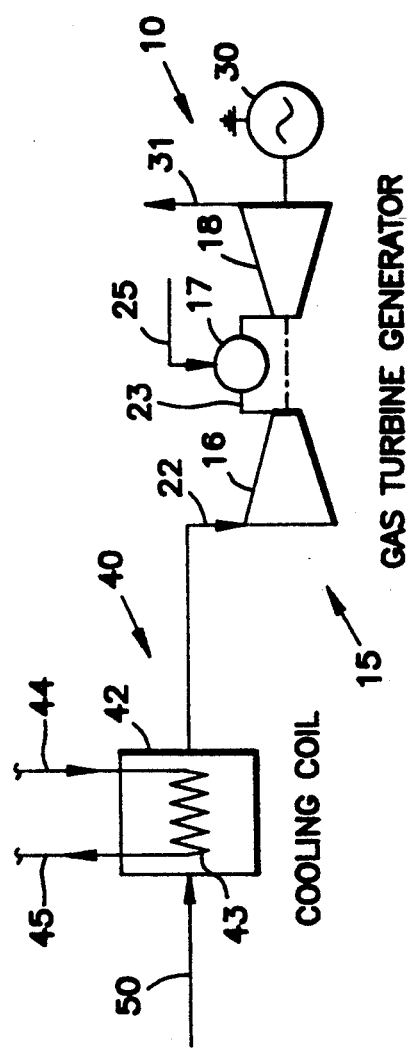
FIG. 3 is a schematic representation of a gas turbine generator modified according to a general process of the present invention.

In FIG. 3 a partial schematic of a gas turbine power generation system 10 improved according to application of certain principles of the present invention is illustrated. The system 10 comprises a gas turbine generator arrangement 15. The gas turbine generator arrangement 15 includes: a compressor system 16; a burner 17; and, an expander 18. Air is fed into compressor arrangement 16 via line 22. Within compressor arrangement 16, the air is compressed within the specifications of the particular gas turbine arrangement 15 involved. In general this will be a compression from about atmospheric pressure to about 15 bar, with an increase in temperature of up to about 600°–700° F. (315°–371° C.). In the schematic of FIG. 3, in a more or less conventional manner, compressed gas from compressor arrangement 16 is shown directed via line 23 through burner 17 and into expander 18. Within burner 17, combustible fuel fed via line 25 is combusted with air from line 23, heating the gases to the appropriate temperature for the expander, typically about 2000°–2200° F. (1090°–1205° C.) for conventional systems. It is the hot off-gases from burner 17 which are then expanded within expander 18 to generate power at generator arrangement 30. Off-gases from the expander 18 are shown expelled via line 31. For a typical conventional gas turbine generator arrangement 15, gases in line 31 will be at about atmospheric pressure and about 1000° F. (538° C.). A typical fuel fed in via line 25, for conventional systems, is natural gas.

A typical gas turbine arrangement is rated with respect to air (gas) flow therethrough. Smaller scale turbines operate with a flow of about 600,000 pounds of air per hour. Larger turbines with, for example, at least 3 to 6 times this demand are common. From these figures, it will be apparent that systems and methods according to the present invention should be adopted for quickly handling very large volumes of air.

In a conventional gas turbine arrangement such as that illustrated at 15, the inlet air at line 22 is ambient air. Thus, the air would have been provided within a wide temperature range, depending upon season and climate. It also would have been provided over relatively wide humidity range, for similar reasons. As explained herein above, it is desirable to control the temperature of the inlet air at line 22, and in particular to maintain a relatively low temperature, i.e. no more than about 55° F., preferably less than 40° F., more preferably no greater than about 20° F., and most preferably no greater than about 5° F. In addition, relative humidity control, i.e. control of moisture content in the air, so as not to exceed certain preferred limits, is desirable. Those preferred limits are generally as described herein above.

According to the present invention, a cooling system 40 is operated to help achieve this. Cooling system 40 comprises a heat exchanger 42 including a cooling coil arrangement 43 therein. The cooling coil arrangement 43 shown comprises a coil of tubular material having a cooling fluid, for example a chilled liquid such as cooling water, passing therethrough. The flow of the water is illustrated directed in at line 44 and out at line 45. An air inlet line for the arrangement is illustrated at 50. In general, air enters via line 50, is cooled (through heat exchange) as it passes over or through coil arrangement 43, and thus emerges at line 22 with its temperature reduced to a selected level, before entering into gas turbine arrangement 15. The air in line 50 may be ambient, or it may be from some upstream process such as a cooling or dehumidification process.

Figure 4:
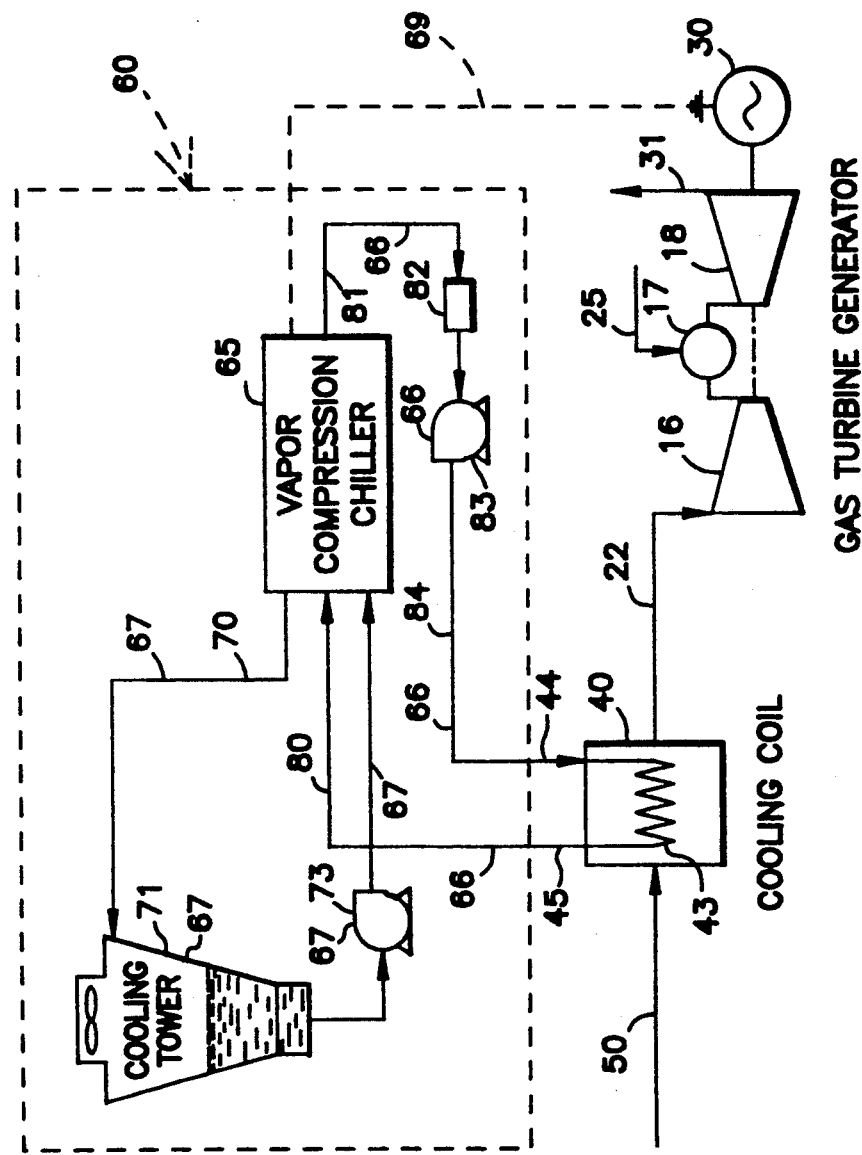
FIG. 4 is a schematic representation of a specific embodiment for accomplishing the general presentation of FIG. 3.

According to certain aspects the present invention there are provided advantageous manners of providing for cooling fluid in passage through cooling arrangement 40. The principles of the present invention will be best understood by considering possible variations in an incremental manner, before fully integrated, preferred, arrangements are examined. Reference is made to FIG. 4, with respect to a first of these variations.

Referring to FIG. 4, like numerals to those utilized in FIG. 3 are used to refer to components with similar purpose or operation. Thus, air from line 50 is directed through cooling arrangement 40 and into the compressor system 16 of the gas turbine power generation system or arrangement. Off-gases from the compressor system 16 are heated at burner 17, and are directed into expander 18. Exhaust gas from expander 18 is illustrated at 31.

In FIG. 4, a system for supplying chilled fluid (typically water or aqueous solution) to cooling coil 43 is illustrated at 60. The system 60 includes: a vapor compression chiller arrangement 65; a circulation loop 66 for directing fluid chilled by vapor compression chiller 65 through coil 43; and, fluid circulation loop 67 for cooling operations within chiller 65.

As described previously herein, a vapor compression chiller of sufficient size and capability to cool large volumes of cooling fluid from an ambient of 75° F.–110° F., to 50° F. or below, would require a substantial compressor for operation. Such a compressor would have a relatively high demand for electrical power, for operation. Herein at line 69 a power line from generator 30 to the compressor 65 is illustrated to reflect this power use. The purpose of this line is to indicate that the system of FIG. 4 does substantially draw on the excess power produced, for operation of the vapor compression chiller 65. This will tend to reduce the overall advantages obtainable from cooling the inlet air of line 50 and 22. The system of FIG. 4 will nevertheless have advantage if the net resulting increase in power production has sufficient value to overcome the cost of operation of the cooling system. It is foreseen that such may be the case in places where electrical energy has a relatively high value during peak use periods as compared to the energy value during off-peak periods. If excess (and less expensive) power during off-peak periods were then utilized to power the vapor compression chiller, and water (or other cooling fluid) cooled thereby was stored for later use, the circulating coolant could be selectively used during peak hours to enhance production of more valuable "peak hour" electricity. (If the vapor compression chiller were of appropriate size, and the reservoir large enough, during off peak hours sufficient cooling fluid could be generated to achieve cooling by cooling coil 45 during all periods of operation, with compressor operation only at off peak times, could be accomplished.)

Still referring to FIG. 4, it will be understood that vapor compression chiller 65 may be of a conventional type having sufficient capacity to cool an appropriate amount of fluid such as water for utilization in the cooling process at coil 43. In general, heat generated in vapor compression chiller 65 is removed via cooling circulation loop 67. Hot water is shown exiting vapor compression chiller 65 at line 70. The line 70 is directed into a cooling tower 71 whereat its temperature is dropped via evaporative means. Water from cooling tower 71 is directed back into the compression chiller 65 for cooling components therein. Pump 73 is illustrated positioned to control fluid flow through loop 67. Vapor compression chiller arrangement 65, in cooperation with cooling loop 67, is utilized to cool fluid, for example water, in loop 66, the fluid of loop 66 being directed through cooling coil 43 and cooling arrangement 40. Fluid feed into the compression chiller is illustrated at line 80. Exit of cold fluid from the vapor compression chiller 65 is illustrated at 81. The cold fluid from line 81 is shown directed into storage reservoir 82. When needed for cooling gases and air line 50, the chilled fluid from reservoir 82 is directed via pump 83 through line 84 to inlet 44. The fluid in loop 66 may be water; for some applications; however, if cooling of the air (in line 50) to temperatures below about 35-37° F. is intended, the fluid in loop 66 will need to be below the freezing point of water; hence alternate fluids such as water/antifreeze mixtures may be used.

Figure 5:
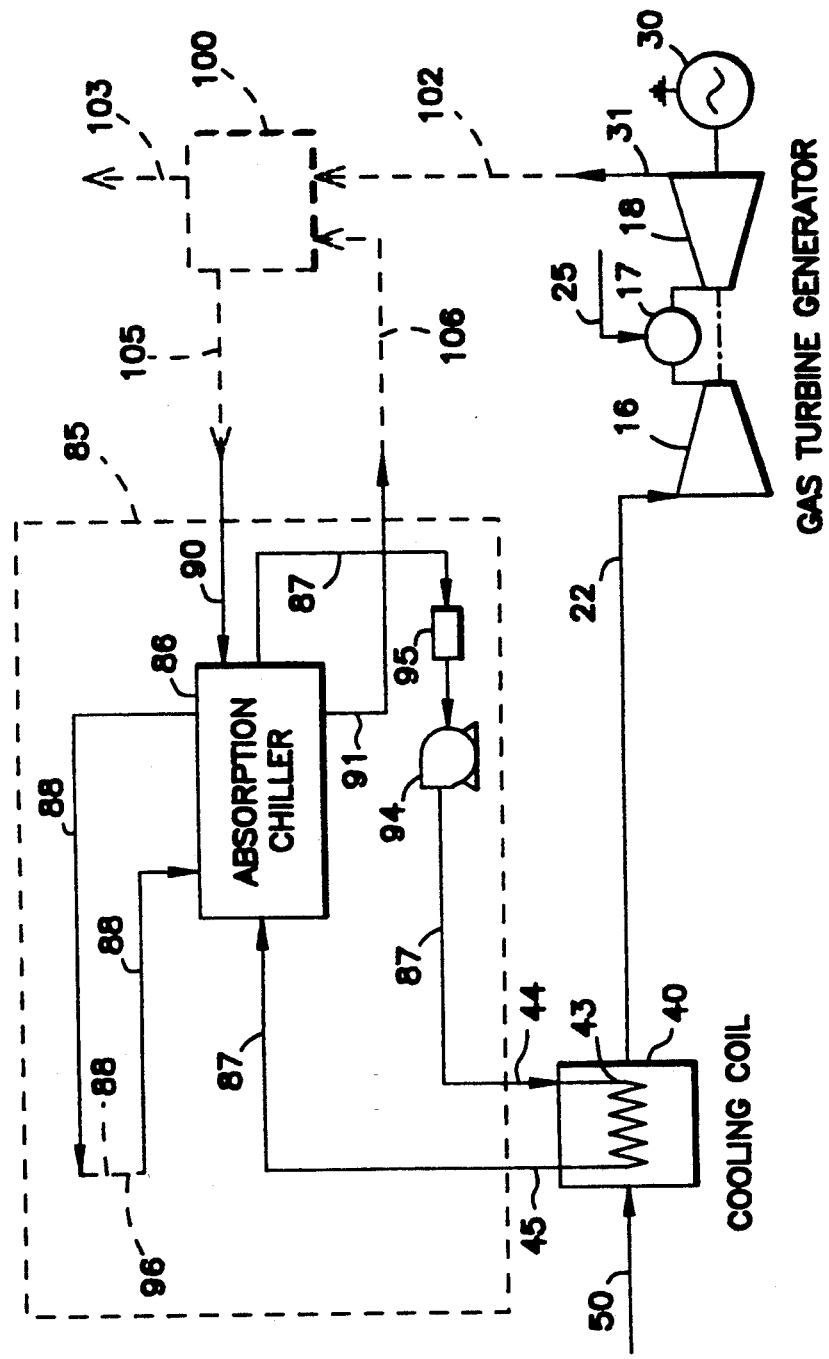
FIG. 5 is a schematic representation for an alternate method of achieving the general embodiment of FIG. 3.

Attention is now directed to FIG. 5 with respect to a second application of principles according to the present invention. In FIG. 5, an arrangement utilizing an absorption chiller is illustrated. The particular system of FIG. 5 utilizes an absorption chiller fired or operated by means of steam or hot water.

Figure 2:
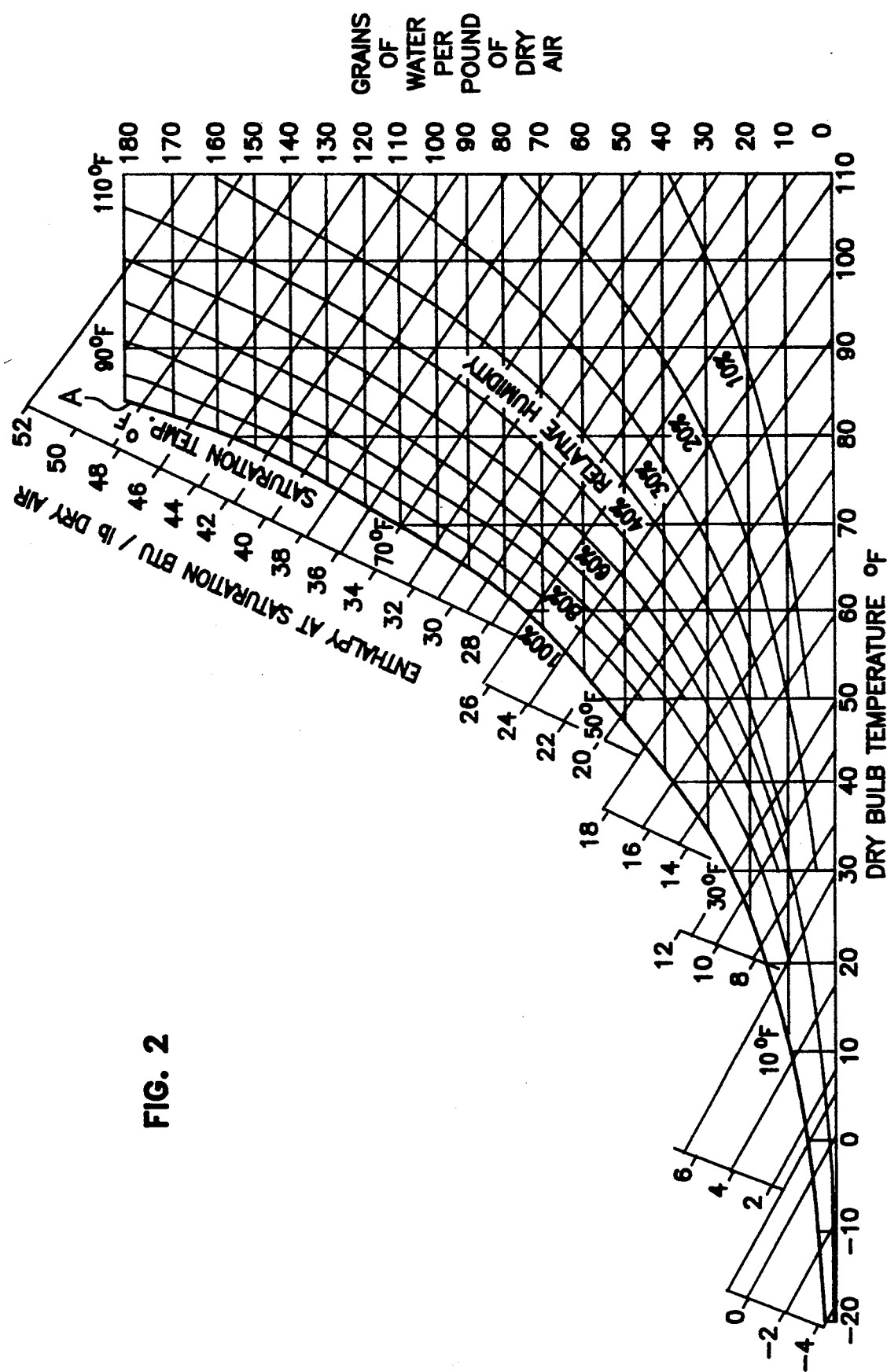
FIG. 2 is a psychrometric chart for air at 29.92 inches of mercury.

Referring to FIG. 5, like numerals to those utilized in FIGS. 2 and 3 refer to components with similar purpose or operation. Thus, again, air from line 50 is directed through cooling arrangement 40 and into compressor 16. Off-gases from compressor 16 are heated at burner 17 and are directed into expander 18. Exhaust gas from expander 18 is illustrated at 31. A generator is indicated at 30.

In FIG. 5, a system for supplying chilled fluid, for example water, to cooling coil 43 is illustrated at 85. The system 85 includes: an absorption chiller arrangement 86; a circulation loop 87 for directing fluid chilled by absorption chiller 86 through coil 43; and, fluid circulation loop 88, providing cooling for processes conducted in chiller 86.

For the system shown in FIG. 5, absorption chiller arrangement 86 may be of a type powered by means of steam or hot water. A steam input line is indicated at 90, with a condensate or off-line indicated at line 91.

A major, power consuming, compressor is avoided in such a system, due to the nature of operations conducted in absorption chiller 86. A small pump 94 is shown positioned in circulation loop 87, to drive chilled fluid through cooling coil 43. The fluid may be stored for use in reservoir 95.

Operation of absorption chiller 86 requires a cooling fluid. The cooling fluid circulates through loop 88. The fluid may be, for example, water stored in a reservoir/cooling tower similar to that illustrated at 71 in FIG. 4. In FIG. 5, phantom line 96 designates the portion of circulation loop 88 in which, among other things, such a reservoir/cooling tower would be located.

For a preferred system employing the general principles of the arrangement of FIG. 5, advantage is taken of heat in exhaust gases at 31 from turbine 18, to facilitate generation of steam or hot water for line 90. For the system shown in FIG. 5, this is accommodated by means of optional heat recovery boiler 100. Exhaust from turbine 18 is shown directed via line 31 and line 102 into heat recovery system or boiler 100. Exhaust gases from heat recovery boiler 100 are shown at line 103. Circulation lines 105 and 106 provide for a coupling of steam or hot water line 90 and condensate or colder fluid line 91, respectively, through heat recovery boiler 100. Thus, heat content for exhaust gases in line 31 are utilized in heat recovery boiler 100 to facilitate generation of steam or hot water, which is directed via line 105 and line 90 into the absorption chiller 86. The resulting condensate is circulated via lines 91 and 106 back into the heat recovery boiler. Off-gases from the heat recovery boiler 100 are illustrated at line 103. Of course, other equipment, for example to use energy in the hot gases of line 31, may be appropriately positioned in line 102 or line 103.

It is foreseen that relatively hot off-gases from the turbine exhaust may be utilized to directly fire an absorption chiller system, to advantage. An embodiment of the present invention illustrating this, is presented in FIG. 6.

Figure 6:
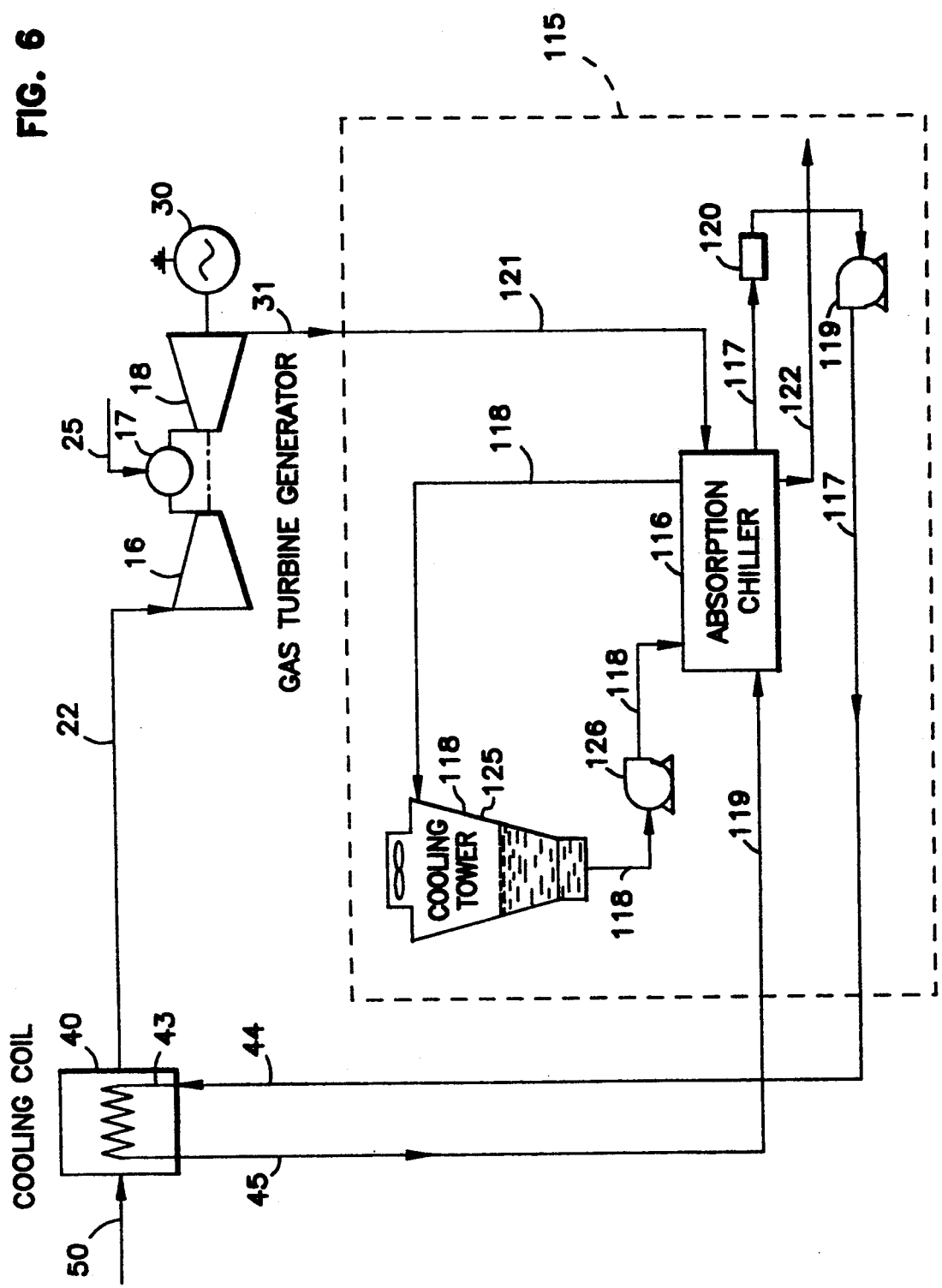
FIG. 6 is a schematic representation of a second alternate embodiment for accomplishing the general embodiment of FIG. 3.

Referring to FIG. 6, like numerals to those utilized in FIGS. 3, 4 and 5 are used to refer to components with similar purpose or operation. Thus, for example, air from line 50 is directed through cooling arrangement 40 and into compressor 16. Off-gases from compressor 16 are heated at burner 17, and are directed into expander 18. Exhaust gas from expander 18 is illustrated at 31. A generator is indicated at 30.

In FIG. 6, a system for supplying chilled fluid (water) to cooling coil 43 is illustrated at 115. The system includes: a "direct" or "gas" fired absorption chiller 116; a circulation loop 117 for directing fluid chilled by absorption chiller 116 through coil 43; and, fluid circulation loop 118, for cooling processes conducted within chiller 116. Circulation loop 117 includes a pump 119 therein to facilitate operation. The cooled fluid for loop 117 may be stored, if desired, in reservoir 120.

As indicated previously, absorption chiller 116 is "direct fired", i.e. it is fired with hot gases. For the arrangement illustrated in FIG. 6, heat for driving the absorption chiller 116 is provided directly by means of hot gas turbine exhaust from line 31. More specifically, the hot exhaust (or a portion of the exhaust) from line 31 is directed into absorption chiller 116 via line 121. Heat therefrom is extracted in absorption chiller 116, for use to power the chiller 116 and cool fluid in circulation loop 117. Exhaust gases from absorption chiller 116 are shown at line 122.

As with the absorption chiller described with respect to FIG. 5, absorption chiller 116 requires a cooling fluid for its operation. Circulation loop 118 provides this. The loop 118 includes a cooling tower/reservoir system 125 and a pump 126 to facilitate operation.

Absorption chillers such as those described with respect to FIGS. 5 and 6 provide substantial advantage in cooling or chilling operations of air, due to their relatively low energy demands. However, they are not completely desirable for use in and of themselves as a cooling method, for preferred applications to the present invention. Reasons for this include the fact that, in general, they are not able to cool the temperature of fluid in circulation loop 88 or 117 to much below about 42° F. This is due in part to the limitations of the reactions conducted in absorption chillers, to afford chilling. Cooling to temperatures substantially below about 42° F. would, in general, require utilization of a vapor compression chiller, with its higher (electrical) energy demands.

Hybrid Systems

It is foreseen that in some instances, hybrid applications of the above-described technology can be useful and advantageous. Factors which would be considered in making such determinations are: the cost/value of steam or hot water at the particular location involved, for driving the absorption chiller; the relative cost/value of electrical power for driving a vapor compression chiller and the compressor associated therewith; the typical ambient temperature, i.e. the amount of temperature reduction of the air to be cooled that is necessary in order to obtain a preferred and efficient utilization of the gas turbine generator; the amount of humidity in the air; whether or not a heat recovery boiler is available on site; the availability of capital for investment in the various chillers involved; etc. It will be apparent that the particular application of the above-described principles will, for any given situation, at least in part reflect assessment of these variables. Several possibilities are reflected in the arrangements of FIGS. 7 and 8, as described herein below.

Consider, for example, a gas turbine generator located at a site whereat industrial steam is readily available and is relatively inexpensive. Consider further such a system located in a part of the country which has a substantial peak hour demand for electrical power, perhaps with a concomitant relatively high value placed on electricity utilized during that period. A hybrid arrangement which may be utilized to advantage under such circumstances, among others, is illustrated in FIG. 7.

Figure 7:
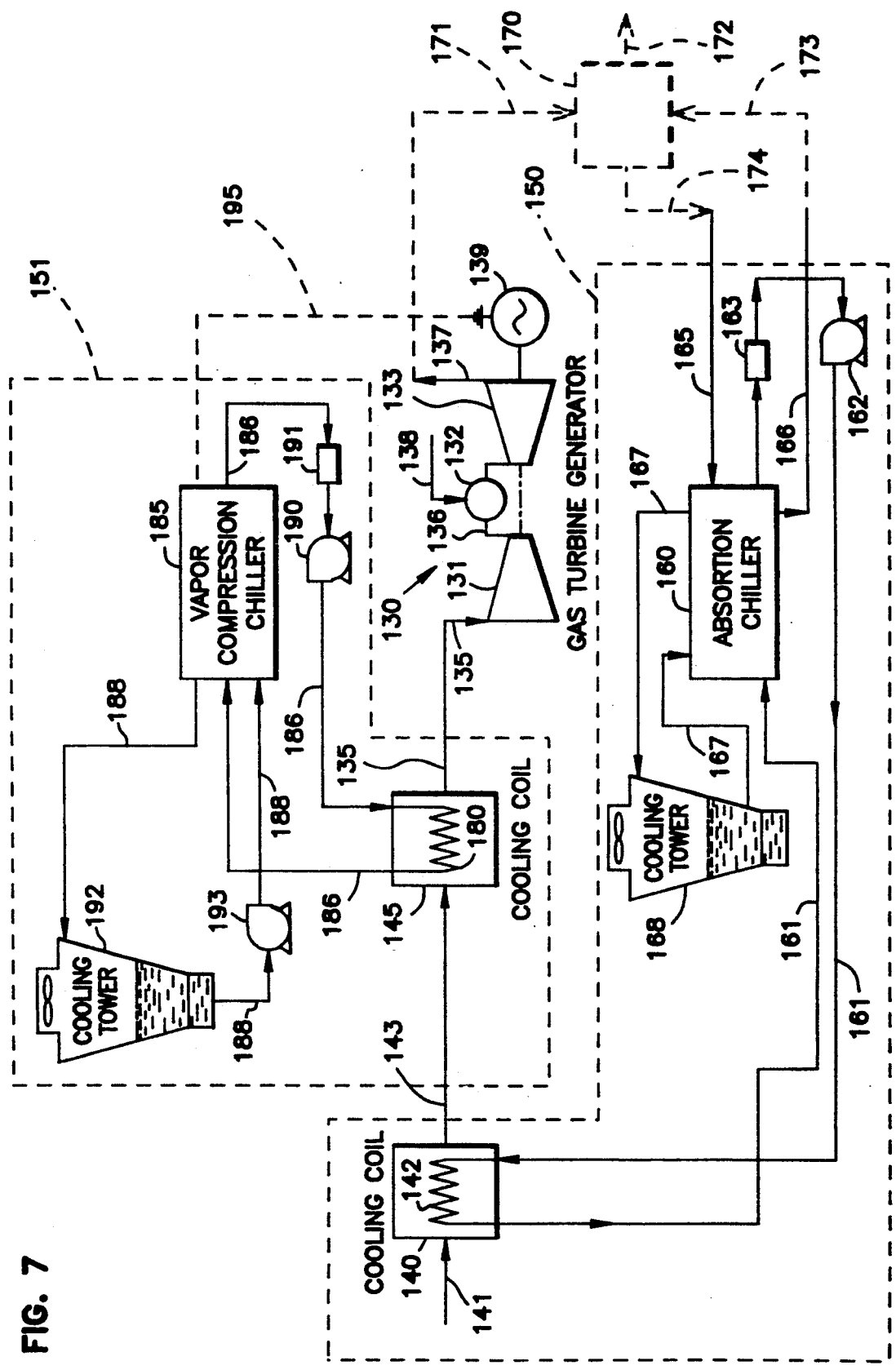
FIG. 7 is a schematic representation of an alternate embodiment of the present invention, utilizing a multistage cooling system.

Referring to FIG. 7, a gas turbine power generation system is depicted at 130 as comprising compressor arrangement 131; burner 132; and, turbine 133. Air inlet line 135 directs air to the compressor arrangement 131. The compressed air is directed through burner 132 via line 136. Turbine exhaust is indicated at line 137. Fuel to burner 132 is indicated at line 138. Power generation is indicated at generator 139.

According to the principles of the present invention, prior to transport into compressor 131 via line 135, the inlet air is cooled to desired amount to achieve a selected enhanced efficiency. In FIG. 7, two systems are illustrated to provide cooling of air to line 135. A first is indicated at cooler 140, which takes air from line 141, cools same via cooling coil 142, and provides cooled air via an outlet line at 143. Air from line 143 is then directed through a second cooler 145 to provide a further step down in temperature, resulting in the air feedline 135 to compressor 131. Thus, two chillers or cooling coils are operated in series, to achieve temperature reduction.

Upon review of FIG. 7, it will be apparent that a multi-stage cooling is selectively operable, one stage or temperature reduction being effected by means of cooler 140, and a later stage selectively accomplished by means of downstream cooler 145. It will be understood that depending upon the ambient air temperature, and the power needs at any particular period of operation, the system of FIG. 7 may be operated with both of coolers 140 and 145 operating, with neither operating, or with only one of the two operating. In the latter instance, it may be either cooler 140 or 145 which is operating.

The arrangement shown in FIG. 7 is referred to herein as a "hybrid" system at least in part because upstream cooler 140 for the arrangement shown is operated by means of an absorption chiller, and downstream cooler 145 is operated by means of a vapor compression chiller. The absorption chiller system is depicted generally at 150. The vapor compression chiller system is depicted generally at 151. In general, operation of the vapor compression system to substantially cool air will require a greater input of electrical energy than operation of the absorption chiller to achieve the same temperature drop. Thus, it is foreseen that in typical applications the absorption chiller will be operated to conduct cooling to the lowest extent it reasonably can.

Still referring to FIG. 7, absorption chiller system 150 includes an absorption chiller 160 operated to provide cooling fluid by means of circulation loop 161 through cooling coil 142. Circulation loop 161 includes pump 162 and reservoir 163 therein.

Absorption chiller 160, for a preferred application, is powered by means of steam or hot water, the steam inlet line being indicated generally at 165, with a corresponding condensate off-line indicated at 166.

Fluid for cooling absorption chiller 160 during operation is provided by means of circulation loop 167. The fluid may be stored in a cooling tower/reservoir such as that indicated at 168.

The absorption chiller system 160 just described may be generally analogous to that previously described with respect to FIG. 5. Through its operation, air in line 141 is cooled a preselected amount. Steam for line 165 may be provided by a number of means, including an optional heat recovery boiler system 170 shown operated via off-gases 137 from the gas turbine expander at 133, in line 171 directed therethrough to outlet 172. For efficiency, steam condensate via line 166 (from line 165) could be directed into heat recovery boiler 170 via line 173, with steam generated released via line 174 into line 165 and absorption chiller 160. In the alternative, steam for line 165 can be provided from other, independent, sources.

It may be, for certain circumstances, that there are reasons why system 150 might not be operated to cool air to the lowest possible extent for utilization in compressor 131. For example, for a specific application it may be found that the extra costs associated with further reduction of the temperature of the air are not justified, during some time periods, in terms of the value of the increased power produced. It may also be that the available absorption chiller system, due to capital costs and/or design limitations, is not sufficient to handle, effectively, temperature reductions of air in line 141 to as low a temperature as desired, when used upstream from gas turbine compressor 131. It may also be that the availability of steam for powering the absorption chiller 160 is intermittent or at least limited. Any of these factors, or similar factors, could justify or dictate operation of system 150 either intermittently or continuously in a manner that does not lead to as low reduction (especially at all times) in the temperature of the air going into the compressor 131 as might be desired.

To selectively buttress operation of absorption chiller cooling system 150, vapor compression system 151 is provided in series therewith. Vapor compression system 151 can be operated to reduce temperature of air line 143 even further than cooling system 150 obtains, for example at peak hours when energy value is at a premium. In the alternative, it can be operated only on particularly hot days, when the extent of temperature reduction is greatest. It may, however, be operated at all times, or anytime a particularly low temperature of air to the compressor is desired.

Still referring to FIG. 7, cooling of air line 143 is achieved via cooler 145, and vapor compression system 151, by means of cooling coil 180. In practice, a chilled fluid (for example water and glycol) is directed through cooling coil 180, which through heat transfer will provide for cooling of air directed thereagainst.

Vapor compression chiller system 151 comprises: vapor compression chiller 185; cooling loop 186, which directs a circulation of cooled fluid generated by vapor compression chiller 185 through coil 180; and, circulation loop 188 which provides a coolant for operation of vapor compression chiller 185.

Circulation loop 186 includes pump 190 and reservoir 191 therein. Circulation loop 188 includes reservoir/cooling tower 192, and pump 193. In general, vapor compression cooling system 151 may be generally operated similarly to the arrangement of FIG. 4, to achieve the desired effect of cooling.

Still referring to FIG. 7, vapor compression chiller 185 may be operated via electrical power generated at generator 139, transmission of energy being reflected by optional line 195. Thus, for example, vapor compression chiller 185 might be operated during off-peak times to generate cooled fluid for reservoir 191, which then can be circulated at peak times in order to cause a further temperature reduction of air in line 143, to facilitate efficiency of operation of gas turbine arrangement 130 when most needed. Vapor compression chiller 185 might also be only operated during particularly hot seasons, or warm weather, etc., when a greater amount of cooling is necessary, or when a higher demand of electricity occurs and thus efficiency of generation arrangement 130 is desired.

An arrangement such as that depicted in FIG. 7 may also be operated with a direct fired absorption chiller utilized in place of absorption chiller 160. In general, the configuration could be as illustrated except instead of utilizing steam at line 165 to drive the absorption chiller 160, a stream of hot gases from a burner or exhaust line 137 could be directed into chiller 160. That is, the arrangement could be as generally shown in FIG. 6.

Figure 8:
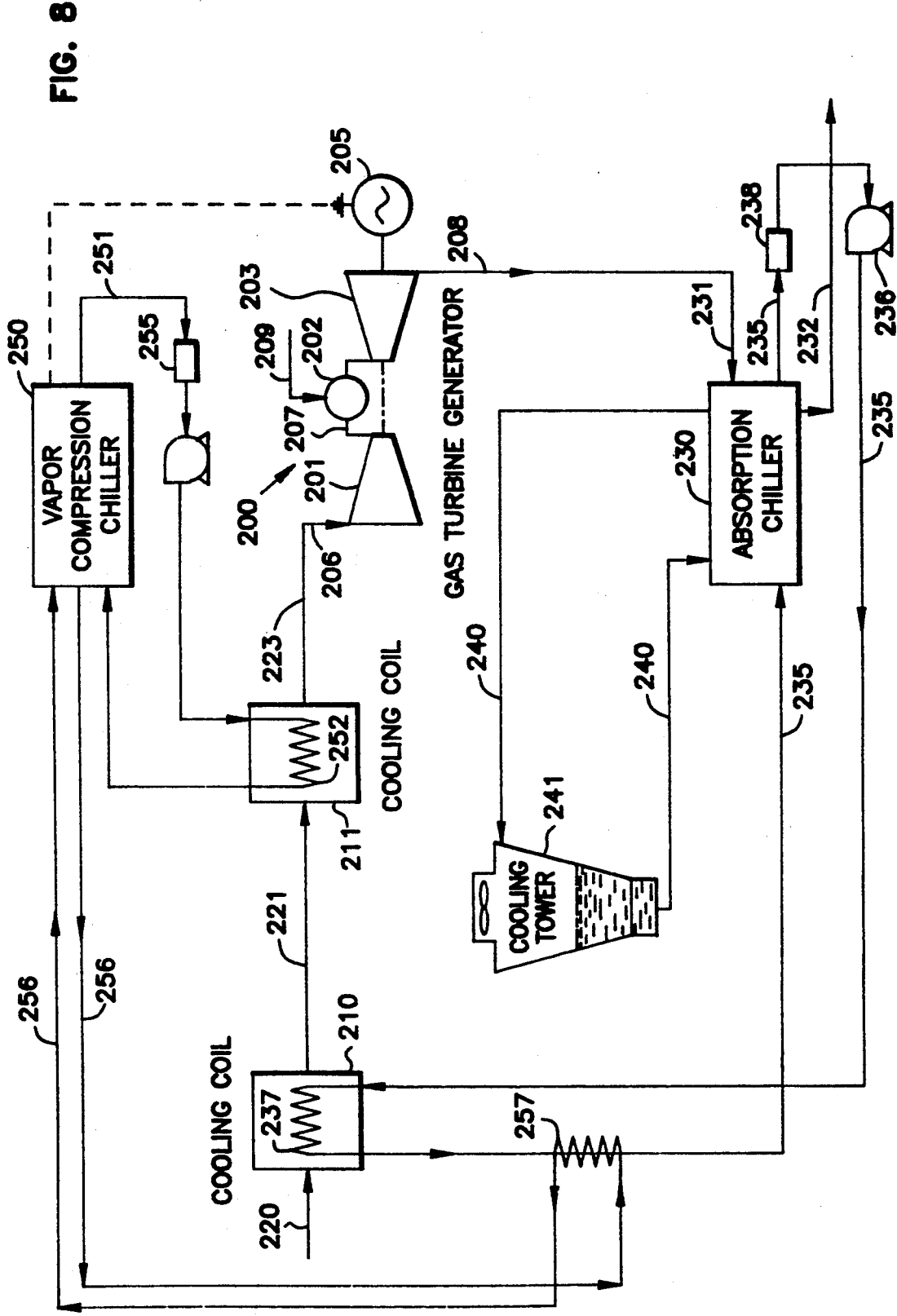
FIG. 8 is a schematic representation of a system according to the present invention for accomplishing two stage reduction of temperature of air; the arrangement of FIG. 8 being an alternative to the arrangement of FIG. 7.

A variation of the arrangement discussed in the previous paragraphs (i.e. FIG. 7) is illustrated in FIG. 8. Referring to FIG. 8, a gas turbine system is generally indicated at reference numeral 200, the system 200 including: a compressor arrangement 201; a burner 202; and, an expander 203. Expander 203 is used to generate power at generator 205. Air inlet flow to compressor 201 is indicated at line 206. Compressed air flow through burner 202 is indicated at line 207. Gas turbine exhaust from expander 203 is indicated at line 208. Fuel is directed into burner 202 by means of 209.

The configuration depicted in FIG. 8 involves a multi-stage (series) cooling arrangement with a first chiller or cooler 210 and a second downstream cooler 211. Air is directed through the first cooler 210 via line 220 and 221. Air from line 221 is passed through cooling system 211, to generate cooled air in line 223 which is ultimately directed into the compressor 201 via line 206.

Cooler 210 for the configuration illustrated in FIG. 8 is operated principally by means of absorption chiller 230. Absorption chiller 230 for the arrangement specifically illustrated in FIG. 8 is a direct fired chiller similar to that utilized in the arrangement of FIG. 6. More specifically, it is directly fired via hot off-gases from expander 203, directed thereinto via lines 208 and 231. The corresponding outlet in absorption chiller 230 for gases from line 231 is reflected at 232. Of course, alternate systems for "firing" absorption chiller 230 may be used.

Absorption chiller 230 is selectively operated to provide cooling fluid in circulation line or loop 235. The fluid in line 235 is circulated, by means of pump 236 through cooling coil 237 and chiller 210. A cooled fluid in coil 237 will result in a temperature reduction of air from line 220 passing thereover. The cooled fluid in loop 235 may be stored in reservoir 238, for use.

Coolant circulation loop 240 provides for cooling of operations conducted within absorption chiller 230. The fluid in loop 240 is directed into and through reservoir/cooling tower 241. Circulation loop 240 may be generally analogous to loop 118 of FIG. 6.

Attention is now directed to cooler 211. For the system of FIG. 8, cooler 211 is part of a hybrid system, and coolant therein is provided by means of a vapor compression chiller system. The system includes vapor compression chiller 250 which is operated selectively to provide coolant flow via circulation loop 251 to cooling coil 252 in cooler 211. As with systems previously described for FIGS. 4 and 7, vapor compression chiller 250 may be utilized to generate a coolant fluid stored in reservoir 255 for circulation as desired through coil 252.

Vapor compression chiller 250, in operation, utilizes circulation loop 256 for cooling of internal processes. For the particular arrangement shown in FIG. 8, temperature of fluid in circulation loop 256 is controlled by means of coil 257, i.e. heat exchange with fluid in circulation loop 235. A purpose of this arrangement is to reduce the power required in vapor compression system 250, by reducing the temperature of the cooling water in line 256 to a lower temperature than can be obtained with a cooling tower.

Embodiments Utilizing Humidity Control

As generally explained in the section above entitled *Problems from Moisture Content*, certain preferred applications of the techniques of the present invention will involve dehumidification of gases prior to introduction of those gases into the compressor of a gas turbine power generation system. A first reason for this, again, is that within portions of typical compressor system reductions in air temperature may occur. More specifically, if the air upstream from that point is saturated with moisture, condensation within the compressor may occur. Further, if the air temperature is sufficiently low, for example, below 32° F. (0° C.), the condensation will be accompanied by freezing, to generate damaging ice particles. In any event, undesirable harm to, or deterioration of, surfaces within the compressor can occur.

In addition, it is foreseen that upstream (from the compressor) cooling processes conducted with a vapor compression chiller and/or an absorption chiller will be facilitated if conducted upon air not saturated with moisture. A reason for this, as explained above, is that energy put into the system for operating the chiller need not be expended in merely causing the condensation of moisture, to allow reduction in temperature. Alternately stated, lower moisture content in the air means the air has less enthalpy, and can be cooled more readily (i.e. with less energy).

For certain selected preferred applications of systems and techniques according to the present invention, a dehumidifier system is operated upstream from the chillers or coolers. An illustration of this is provided in the schematic of FIG. 9.

Figure 9:
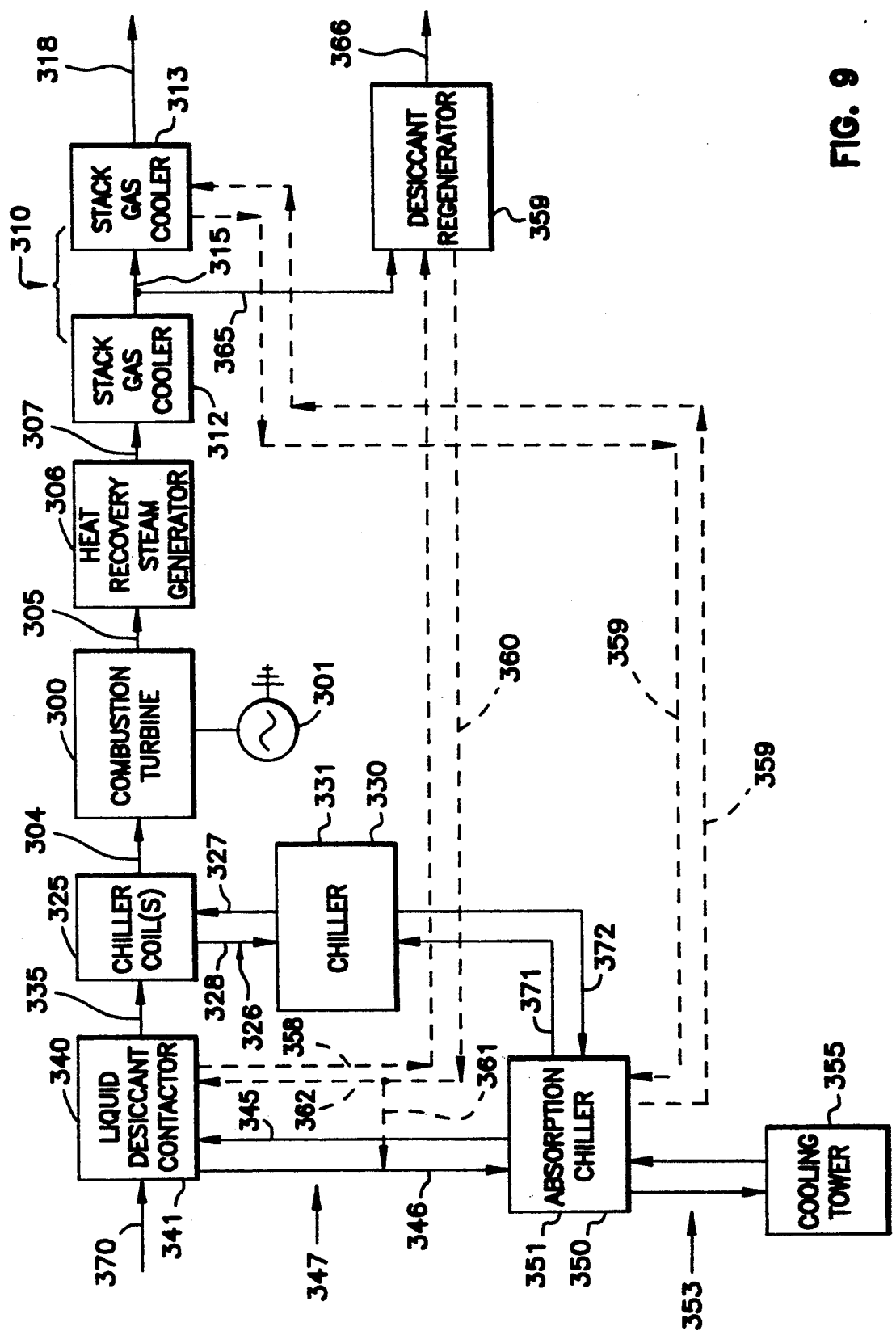
FIG. 9 is a schematic representation of a gas turbine power plant system utilizing principles according to the present invention.

Referring to FIG. 9, the system generally involves production of energy by gas turbine arrangement 300 via generator 301. The gas turbine arrangement 300, represented in schematic, may be as previously described with respect to comprising: a compressor arrangement; a burner; and, an expander. A gas inlet line to the compressor is generally indicated at 304 with a gas outlet from the expander indicated at 305. As with previously described systems employing principles according to the present invention, means are provided in FIG. 9 for accomplishing cooling of air directed into the combustion turbine system 300 by means of line 304, preferably to less than about 55° F. and no more than about 40° F., more preferably to no more than about 20° F., and most preferably to no greater than about 5° F.

For the arrangement illustrated in FIG. 9, certain downstream processes from turbine arrangement 300 are illustrated, schematically. More specifically, hot gases (about 900 to 1100° F.) from the turbine arrangement 300 at a reduced pressure of about atmospheric are shown directed through a heat recovery steam generator system 306 which may be utilized for generation of further electrical power. Off-gases from this system via line 307, still hot and typically at a temperature about 500 to 800° F., are shown directed via line 307 to a stack gas cooler system 310. For the arrangement shown in FIG. 9, a two-stage stack gas cooler system is depicted, with a first stage of cooling conducted by cooler 312, and a second stage of cooling being conducted via downstream cooler 313. Gas flow between coolers 312 and 313 is reflected via line 315; and, off-gases are vented to the atmosphere via line 318.

For the arrangement illustrated in schematic in FIG. 9, gas line 304, directed into gas turbine arrangement 300, is provided with appropriately cooled and dehumidified air therein, for a preferred efficient operation of processes at the gas turbine system 300. Selected cooling of the gases for line 304 is illustrated upstream of turbine 300, at chiller coil(s) 325. The chiller coil(s) 325 depicted in schematic may represent a plurality of chiller coils, for example located in series, operated via a variety of means. Chiller coil(s) 325 illustrated is operated by a cold fluid circulation loop 326 including inlet line 327 and outlet line 328. The cold fluid for directing through chiller coil 325 is generated via chiller system 330 (which may comprise a plurality of chillers). Chiller system 330 may be analogous to any of the previously described systems; however, preferably it comprises a vapor compression chiller 331. It is foreseen that system 330 may include in association therewith a variety of systems not specifically separately depicted including: a reservoir for cooled fluid to be stored prior to being directed through loop 326; and, appropriate pump systems for directing fluid through loop 326. Of course, power for operation of chiller system 330 may, if desired, be obtained from generator 301.

Air is shown directed into chiller coil(s) 325 via upstream gas line 335. As thus far described, the arrangement of FIG. 9 may be generally as described above with respect to any of the arrangements of FIGS. 4 through 8, most typically and preferably an arrangement similar to that illustrated in FIG. 4.

As previously indicated, the system of FIG. 9 includes means for dehumidification of air prior to its direction into turbine arrangement 300. Preferably the dehumidification is conducted upstream from chiller coil 325, so that a substantial amount of energy from vapor compression chiller 331 is not expended in an operation of generating condensation. That is, preferably air in line 335 is provided with an appropriate low relative humidity so that: cooling processes conducted within system 325 are not associated with substantial moisture condensation; and, the air leaving cooling system 325, when cooled to the desired extent thereby, is not saturated and preferably has a moisture content sufficiently low so that saturation would not be reached unless the temperature was further dropped by at least about 5° F. (about 2.5° C.). Most typically, it is foreseen that preferably the air in line 335 has no greater than about a 20–35% relative humidity, and the air in line 304 is provided at a temperature such that its relative humidity is no greater than about 80%.

Still referring to FIG. 9, gas line 335 is shown directed into chiller coils 325 from dehumidification system 340. For the particular arrangement of FIG. 9, the dehumidification system 340 comprises a liquid desiccant contactor 341.

The operation of the liquid desiccant contactor 341 is described in greater detail below. In general, within liquid desiccant contactor 341 a spray of cold desiccant solution is directed into air passing through the contactor 341. The liquid desiccant solution, sprayed into the air passing through contactor 341, will tend to remove moisture from the air, reducing absolute humidity (i.e. reducing grains of moisture per unit volume or weight of air). The liquid desiccant (with moisture picked up from the air) will collect in the bottom of the contactor 341 and can be drained therefrom. Referring to FIG. 9, an inlet line for directing cold desiccant solution into contactor 341 is illustrated at line 345. An outlet line for the desiccant is illustrated at line 346. For the arrangement illustrated in FIG. 9, lines 345 and 346 comprise portions of a circulation loop 347 directing the liquid desiccant through a chiller 350 so that it is maintained cold. Preferably, chiller 350 comprises an absorption chiller 351 operated in association with a cooling fluid loop 353 including cooling tower 355. Absorption chiller 350 and loop 353 may be, for example, analogous to the ones previously described above with respect to FIGS. 5 and 6. For the arrangement illustrated chiller 350 is operated by means of steam or hot water generated at stack gas cooler 313 and circulated via circulation loop (optional) reflected at 359.

Liquid desiccant contactor 341 may be of any of a variety of types. A typical contactor constructed and arranged for utilization in systems according to the present invention will utilize as a desiccant an aqueous solution of material such as lithium chloride or calcium chloride. It is foreseen that in general a typical absorption chiller system 350 can be utilized to provide cold desiccant at a temperature of about 42–50° F., to be delivered to air in the liquid desiccant contactor 341. The desiccant can be utilized to reduce the humidity of about 50° F., moisture saturated, air within the contactor 341 to a level of about 10–35% relative humidity.

As the liquid desiccant sprayed within contactor 341 is circulated, and picks up more and more moisture from air directed through contactor 341, it will become more dilute and desiccant regeneration will be needed. In FIG. 9, a bleed line 358 to a desiccant regenerator 359 is depicted. It is foreseen that a small percentage of desiccant solution collected within contactor 341 will, in use, be directed through line 358 to a desiccant regenerator 359, whereat a portion of the moisture will be drawn off. Following this process, the regenerated desiccant solution can be directed via line 360 back into the contactor system 341. This may be done either by spur line 361 directing the desiccant into the cooled circulation loop involving chiller 350; or, via spur line 362 directing the regenerated desiccant solution directly back into the contactor 341, or both. In general, desiccant regenerator 359 is a system which allows for evaporation of some of the water content of solution fed thereto, to increase the concentration of the desiccant in the solution. For the arrangement shown in FIG. 9, heat (or hot gases) for conduction of drying operations in desiccant regenerator 359 are shown derived from hot gases in line 315 via line 365. At 366, gases/moisture from desiccant regenerator 359 are shown vented, for example to the atmosphere.

Still referring to FIG. 9, air flow into dehumidifier system 340 (i.e. for the embodiment shown liquid desiccant contactor 341) is illustrated at line 370. This air may be provided at ambient temperature or, as described with respect to the preferred embodiment depicted in FIG. 10, it may be "precooled" via upstream processes. Advantageously, the upstream processes may provide the cooled air in a saturated state, since the dehumidifier system 340 will protect the downstream chiller 325 from being used less efficiently, i.e. to condense moisture.

For the arrangement illustrated in FIG. 9, cooling fluid for operation of chiller 330 is provided by means of another chiller, specifically chiller 350, via a circulation loop comprising lines 371 and 372. Thus, the arrangement is configured so that an absorption chiller 350 is shown utilized to facilitate operation of a vapor compression chiller 331. In the alternative, chiller 331 may be cooled as previously described with respect to other embodiments.

In certain preferred applications of the present invention, air at line 370, FIG. 9, is provided at no greater than about 50° F. That is, preferably the operation conducted at dehumidifier 340, particularly when a liquid desiccant contactor 341 is used, it is not itself a substantial cooling operation but rather is merely a dehumidification process. It is, however, recognized that at least some cooling will typically be taking place within contactor 341 since absorption of water by the desiccant from the air will be associated with a generation of heat. The cold temperature of the desiccant solution will dampen or counteract this heating, hence it "cools" the air.

Should the ambient temperature be substantially greater than about 50° F., preferably the air in line 370 will have been cooled prior to its introduction into the dehumidification system 340 via line 370. It is foreseen that preferably the operation conducted to achieve this cooling, is a water spray process. That is, preferably the air is cooled by spraying cold water thereinto. The addition of water to the system, for an arrangement such as that described with respect to FIG. 9, upstream from dehumidification system 340 does not present a substantial problem with respect to increased humidity, since a downstream dehumidification system 340 is provided.

Figure 10:
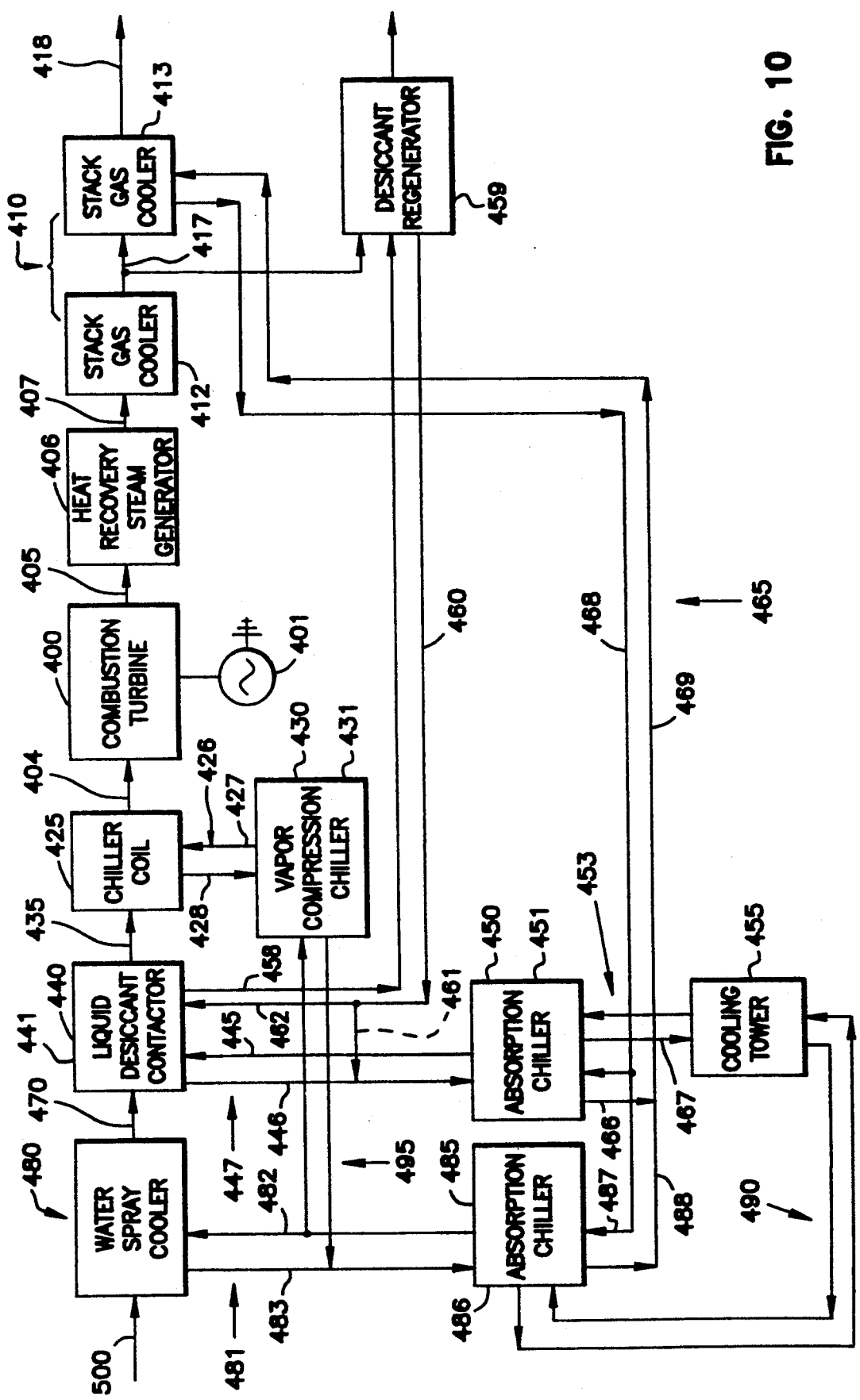
FIG. 10 is a schematic representation of an alternate system to that shown in FIG. 9.

An arrangement for accomplishing the above, is illustrated in FIG. 10. It will be apparent from the following description, that the arrangement illustrated in FIG. 10 comprises a variation of the arrangement illustrated in FIG. 9. Referring to FIG. 10, a gas turbine 400 is depicted for use in coordination with generator 401 for production of energy. An inlet line to a compressor (not separately shown) of the gas turbine 400 is illustrated at 404. An outlet line 405 is illustrated, directing hot gases therefrom into heat recovery steam generator system 406. Cooler gases from generator 406 are directed via line 407 through stack gas cooler system 410. Stack gas cooler system 410 comprises first and second coolers 412 and 413 connected in series via gas line 417. Off-gases are vented to the atmosphere via line 418.

As with the arrangement of FIG. 9, upstream from gas turbine arrangement 400, a chiller coil 425 is depicted, for cooling of gases. Coil 425 is operated by means of circulation loop 426 comprising lines 427 and 428 in communication with chiller system 430. Preferably chiller 430 comprises a vapor compression chiller 431. The chiller 431 is operated, as previously described for FIG. 9, to provide cooling fluid through loop 426 to operation of chiller coil 425. An air inlet line to chiller coil 425 is illustrated at 435.

The system illustrated in FIG. 10 is operated with a dehumidification system 440 oriented upstream of gas line 435, to provide dehumidified gas to line 435. Preferably system 440 comprises a liquid desiccant contactor 441 of a type similar to that described above with respect to FIG. 9. Liquid desiccant to liquid desiccant contactor 441 is circulated via inlet line 445 and outlet line 446, i.e. loop 447, for operation. Loop 447 includes chiller 450 therein, to provide the liquid desiccant at an appropriately cooled temperature. Preferably chiller 450 is an absorption chiller 451 operated generally as previously described, for example cooled via circulation loop 453 involving fluid cooling tower 455.

The arrangement illustrated in FIG. 10, similarly to the arrangement of FIG. 9, includes a bleed line 458 of liquid desiccant, directed toward desiccant regenerator 459. The regenerator solution is directed via line 460 back into the loop 447, either via spur line 461 or spur line 462.

For the arrangement illustrated in FIG. 10, absorption chiller 451 is powered by means of steam or hot water generated at stack gas cooler 413, via circulation loop 465, involving spur lines 466 and 467 and main trunk lines 468 and 469.

As thus far described, the arrangement of FIG. 10 is generally analogous to that of FIG. 9. FIG. 10 differs, however, through utilization of a water spray cooler system oriented upstream from line 470, the feedline into contactor 441. Referring to FIG. 10, the water spray cooling system is indicated generally at 480. System 480 generally comprises a chamber through which air is directed. Within the chamber a spray of cold water is directed through the air, to cool same. Water is provided to the sprayers within system 480, via coolant water circulation loop 481 involving inlet line 482 and outlet or drain line 483. Cooled water for circulation in loop 481 is provided by means of chiller 485. Preferably chiller 485 is an absorption chiller 486 which, similarly the chiller 451, is powered by means of stack gas cooler 413 via loop 465, and in particular via spur lines 487 and 488. Chiller 486, similarly to chiller 451, may be operated in association with cooling fluid provided via cooling tower 445, as a result of cooling loop 490.

For the arrangement illustrated in FIG. 10, chiller 430, i.e. vapor compressor chiller 431, is cooled via fluid cooled by absorption chiller 486, fluid communication being provided via loop 495.

In FIG. 10, inlet air to system 480 is illustrated at line 500.

Operation of preferred embodiment FIG. 10 will be understood from the following hypothetical example. For the example, it will be assumed that the ambient air provided at the site of generation is at a temperature of about 95° F. (35° C.), with 64% relative humidity; and, prior to introduction to the gas turbine, it is desired to reduce the temperature of the air to about 20° F. (−7°

C.) with no more than about 80% relative humidity at that temperature (20° F.).

With respect to this air, attention is first directed to FIG. 2. FIG. 2 indicates that air of about 64% relative humidity and about 95° F. contains about 160 grains of moisture per pound dry air. Air of 64% relative humidity is saturated at a temperature of only about 82° F. Thus, if it is to be cooled to about 20° F., it will need to be greatly reduced in moisture content.

The system of FIG. 10 is configured for a preferred, relatively efficient, conduction of the air cooling operation. This will be apparent from certain of the following descriptions, especially if considered in view of some of the above-described details.

It is foreseen that a great deal of the cooling effort will be taken up in removing the water vapor from the 95° F., 64% relative humidity, air. The system of FIG. 10 is configured to achieve this in an advantageous manner.

Initially, the inlet air of 95° F. and 64% relative humidity is cooled to the extent reasonable, by means of spraying cold water therethrough in system 480. It is foreseen that with an absorption chiller 486 utilized to provide cold fluid to the spray in system 480, fluid at a temperature of about 42° F., and no colder, can be fairly readily and efficiently provided. This, in general, results from limitations due to the lithium bromide cooling system of a typical absorption chiller 486; and, operation of absorption chiller 486 with steam generated by off-gases, for example at stack gas cooler 413. In system 480, then, the air passing therethrough via line 500 encounters a cold water spray at about 42° F. This will decrease the temperature of the air, and drop the moisture content of the air (in terms of grains per pound dry air, relative humidity will likely increase to 100% or thereabouts). It is foreseen that in general an off-gas stream at line 470 of about 50° F., essentially saturated, can be readily obtained.

The next step of the process conducted with the system according to FIG. 10, is a reduction in the moisture content of the air from line 470. For the example described, this is a reduction in moisture content without any further substantial cooling of the air. The process is achieved via liquid desiccant contactor 441 provided with a chilled desiccant solution via absorption chiller 451. Again, it is foreseen that a spray of desiccant solution at about 42° F. can be readily provided by means of absorption chiller 451, powered via hot water or steam generated at stack gas cooler 413. It is foreseen that if a 42° F. desiccant solution is sprayed into the saturated air at line 470 (if the air is at 50° F.) a reduction in humidity to about 10%–40% relative humidity (with the temperature remaining at about 50° F.) can be fairly readily obtained. This, it is foreseen, is the nature of the air at line 435, following the dehumidification process. Referring to FIG. 2, the air (20% relative humidity) is characterized in the chart. It can be seen that the air can now be readily cooled to 35° F. or below, without substantial problems with condensation, as the air would not be saturated until very low temperatures (12° F.) are reached.

The next step of operation is then to reduce the temperature of the air to the desired inlet temperature for the combustion turbine 400. For the system illustrated in FIG. 10, this is accomplished via chiller coil 425 operated with a circulation loop 426 provided via vapor compression chiller 431. It is foreseen that the vapor compression chiller 431 can be readily operated to achieve air in line 404 at about 20° F. and, as a result of the cooling operation, with less than 80% relative humidity.

Principal limiting factors to systems operated generally according to the principles of the system illustrated in FIG. 10, are the limitations of operation of an absorption chiller, which for the system is utilized to cool the water spray to the cooler 480, the liquid desiccant spray to the dehumidifier 440 and the vapor compression system 431. As indicated above, absorption chiller systems of the type preferred for application in systems according to the present invention generally cannot be operated to prepare a cooled liquid below about 42° F. This means that, as a practical matter, air passing through systems cooled with fluid from absorption chillers cannot be cooled to much below about 42°–50° F. Thus air coming off the dehumidifier 440 will in general be no cooler than about 42°–50° F., and would most preferably be cooled at least another 10°–20° F. before introduction into the gas turbine. With technology presently generally available for cooling, a vapor compression chiller at chiller 430 will generally be preferred.

It will, in general, be preferred to direct air via line 404 into the combustion turbine 400 at a relative humidity content which is less than 100% for reasons described above. Preferably, a relative humidity content of less than about 80% is preferred. Most preferably, air directed into the combustion turbine 400 is, for its humidity content, at least about 5° F. (or about 2.5° C.) higher than 100% saturation for the same absolute humidity content (see FIG. 2) so that should some cooling occur within turbine 400, condensation and/or ice formation will be unlikely. The term "absolute humidity content" and variants thereof is meant to refer to weight or mass of water per unit weight or volume of air.

Systems for Conducting Water Spray Cooling and Liquid Desiccant Contactor Dehumidification It is foreseen that a variety of mechanical systems may be utilized to achieve the steps conducted in systems 480 and 440 of FIG. 10, i.e. water spray cooling and liquid desiccant contact for dehumidification. One such system is illustrated in FIG. 11 at reference numeral 520.

Figure 11:
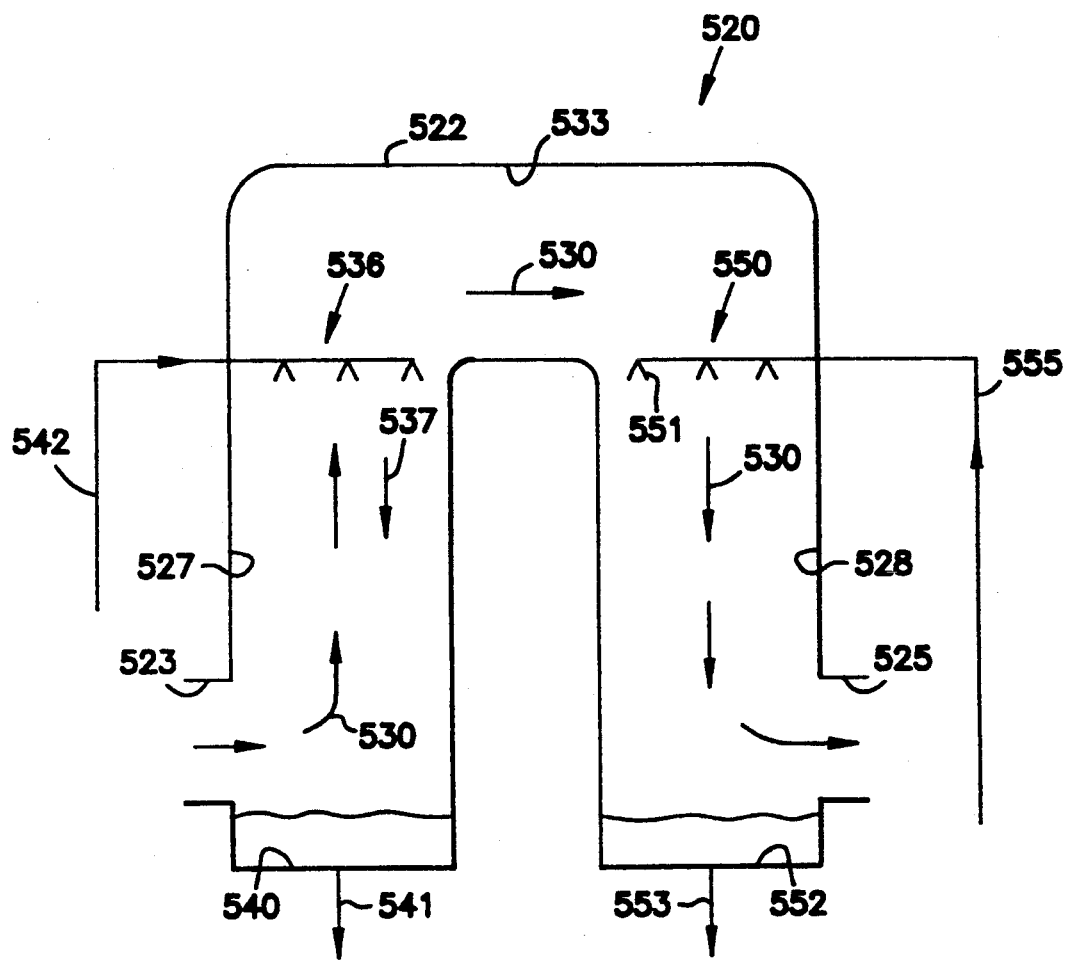
FIG. 11 is a schematic representation of a combined water spray cooler/liquid desiccant contactor for utilization in systems according to the present invention.

Referring to FIG. 11, system 520 is depicted in schematic is comprising an inverted U shaped shell 522 having an air inlet at 523 and an air outlet at 525. With respect to the system illustrated in FIG. 10, inlet 523 corresponds to line 500, and outlet 525 corresponds to line 435. Shell 522 can be depicted as separated into a first section 527 in which air cooling takes place via water spray; and, a second section 528 in which desiccant contact for dehumidification, occurs.

Air flow through shell 522 is generally depicted along lines 530. It is foreseen that in operation shell 522 would be oriented vertically, with region 533 positioned substantially above inlet 523 and outlet 525.

A cold water sprayer system is illustrated at 536, generating spray at 537. The spray is directed countercurrent to gas flow stream 530. The spray will tend to cool air coming in via line 523. Water, from the spray and including condensed water from the air, will collect in well 540 (as a liquid phase), from which it can be drawn off via line 541. Line 542 is provided as a feedline for cold water to sprayer 536. Various baffle systems, not shown, may be used to achieve desired air flow and air/water (i.e. gas phase/liquid phase) separation. In general, line 541 corresponds to line 483, FIG. 10; and, line 542 corresponds to line 482, FIG. 10.

The gaseous phase (cold air phase) is separated from spray at 536, and the air moves along the path of arrows 530 and passes into region 533. This air will, in preferred applications, have been cooled via the cold water from sprayer 536. It will also, in most practical applications, be saturated with moisture.

In region 528, desiccant sprayer 550 is oriented to generate a spray 551 directed into air line 530. The liquid phase from spray 551 of desiccant solution collects in well 552. The collected fluid is removed from well 552 via line 553. Desiccant solution is directed to spray 551 via line 555. The gaseous phase (dehumidified air) leaves system 520 via outlet 525. Various baffle means, not shown, may be used to obtain preferred air flow and to facilitate liquid phase gas phase separation. Comparing FIGS. 10 and 11, line 553, FIG. 11, corresponds to lines 446 and 458, FIG. 10; and, line 555, FIG. 11, corresponds to lines 445 and 462, FIG. 10.

It is noted that arrangements such as those described with respect to FIG. 11 involve the spray of a considerable amount of liquid into rapidly flowing air or gas streams. The droplets of spray can very readily move from the air streams, and directed into the wells or reservoirs as schematically indicated, through appropriate placement of mist eliminators within the arrangement. Mist eliminators, in general, are well known for application in spray systems. It is foreseen that the technology may be directly applied here.

Figure 14:
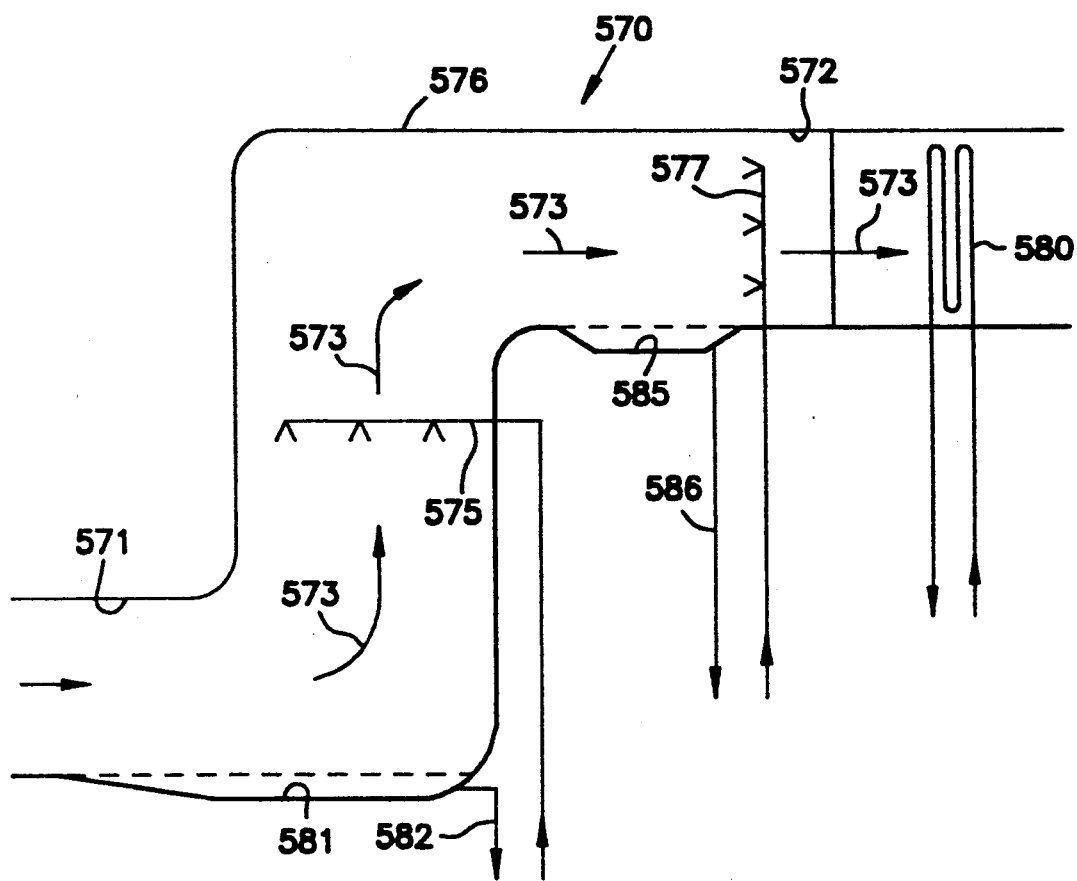
FIG. 14 is a schematic representation of a combined water spray cooler/liquid desiccant contactor system, to that illustrated in FIG. 11.

An alternate system for conducting water spray cooling and liquid desiccant contactor dehumidification is illustrated in FIG. 14.

In FIG. 14, a liquid desiccant contactor is indicated generally at 570, including inlet 571 and outlet 572. Air is shown passing through the system by means of arrows 573. A cold water sprayer arrangement is indicated at 575, for spraying cold water into the air, cooling same. Saturated air in region 576 is directed into desiccant sprayer 577, for dehumidification. The dehumidifier gaseous phase leaves via outlet 572, and for the particular system depicted is directed toward a downstream cooler illustrated at 580.

Still referring to FIG. 14, at 581 a well is oriented, for collection of the liquid phase resulting from sprayer 575, for drainage via line 582. At 585 a well is indicated for collection of the liquid phase from liquid desiccant contact, for drainage and recirculation via line 586. It will be understood that the arrangement of FIG. 14 may be operated to achieve a substantially similar effect with respect to treatment of gases passing therethrough, as the arrangement of FIG. 11.

Specific Systems Improved and Operated According Processes of the Present Invention In the previous descriptions, general techniques processes and equipment for application and the principles of the present invention have been provided. Herein, specific applications for typical existing gas turbine power generation arrangements will be provided. Schematics reflecting the systems described with respect to these examples, are provided in FIGS. 12 and 13.

Figure 12:
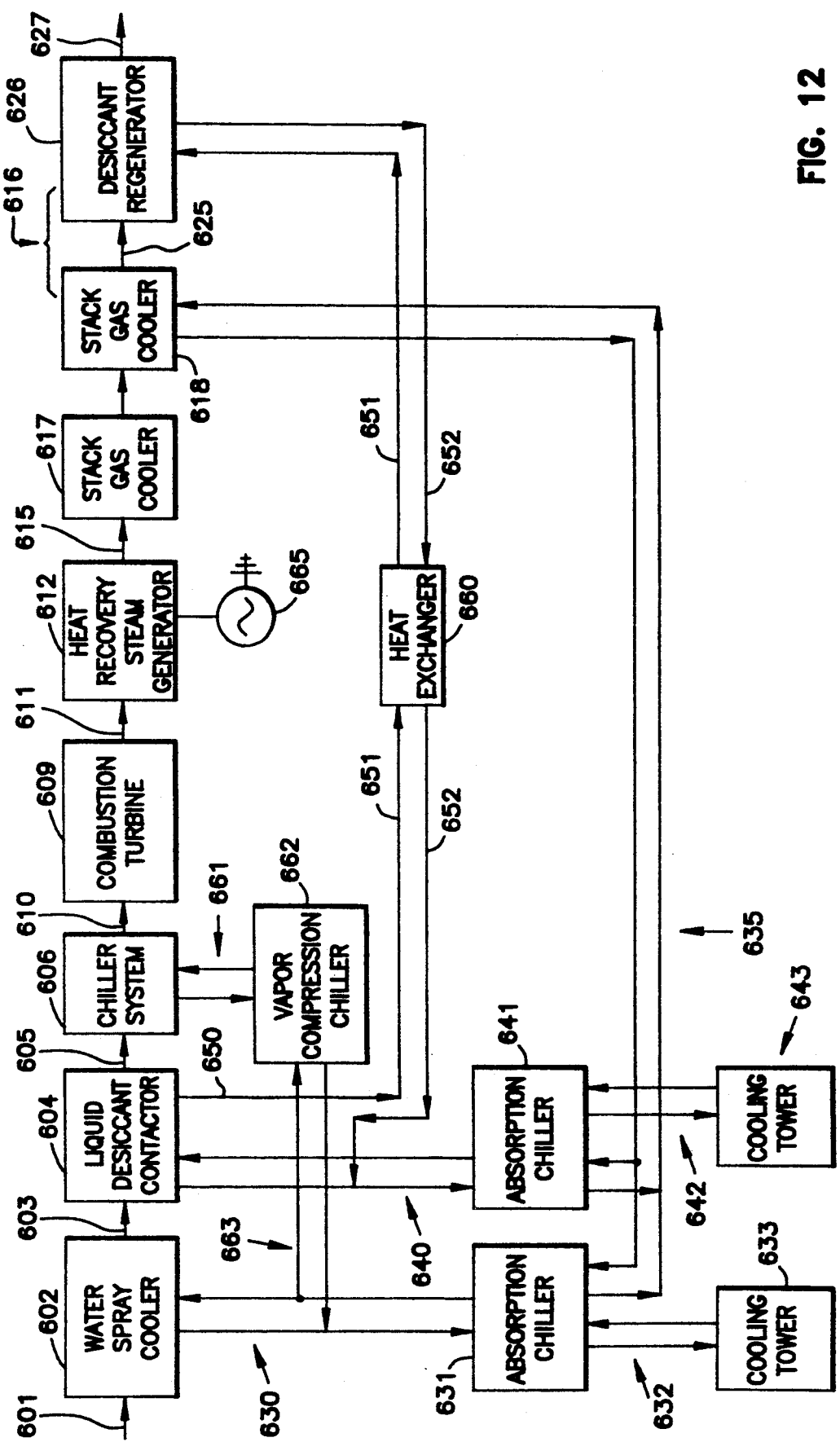
FIG. 12 is an overall schematic representation of a gas turbine power plant system according to the principles of the present invention; the arrangement of FIG. 12 being alternative to that illustrated in FIGS. 9 and 10.

Consider first an arrangement configured as illustrated in FIG. 12. FIG. 12 is configured analogously to FIG. 10 except: for the provision of a separate cooling tower associated with each absorption chiller; a heat exchanger 660 in the circulation loop for the desiccant regenerator in order to recool regenerated desiccant before introducing it into the circulation loop between the absorption chiller and the associated liquid desiccant contactor; and, the positioning of the desiccant regenerator such that all off-gases from the two-stage stack gas cooler arrangement are directed therethrough. Thus, referring to FIG. 12, ambient air from line 601 is directed through water-spray dehumidifier 602 and via line 603 is directed into liquid desiccant contactor 604. Cooled, dehumidified, air from liquid desiccant contactor 604 is directed via line 605 to chiller coil 606. System 606 may be a chiller coil, or a cold liquid spray system. The air, now conditioned for utilization in the gas turbine 609 is directed thereto via line 610. Off-gases from the combustion turbine system 609 are directed via line 611 through a downstream heat recovery steam generator 612. Heat recovery steam generator 612 may be, for example, a steam boiler power generation system. Hot off-gases from the heat recovery steam generator are directed via line 615 into stack gas cooler system 616, comprising first and second stages 617 and 618 respectively. Off-gases from stage two gas cooler 618 are directed via line 625 through desiccant regenerator 626, for venting to the atmosphere via line 627.

Cold water spray to water spray dehumidifier 602 is provided via circulation loop 630, and absorption chiller 631. Processes conducted within the absorption chiller 631 are cooled via fluid in circulation loop 632 and cooling tower 633. Absorption chiller 631 is hot water powered via water heated at stack gas cooler 618, through circulation loop 635.

Cold desiccant to liquid desiccant contactor 604 is provided via circulation loop 640 and absorption chiller 641. Processes conducted with an absorption chiller 641 are cooled via circulation loop 642 and cooling tower 643. Absorption chiller 641 is powered by means of steam or hot water generated to stack gas cooler 618, via circulation loop 635.

A bleed line of desiccant, for regeneration, from liquid desiccant contactor 604 is illustrated at 650. The bleed line 650 is circulated via line 651 through desiccant regenerator 626, and then via line 652 the regenerated desiccant is directed back into recirculation loop 640. Heat exchanger 660 (and the circulation loop comprising lines 650, 651) and desiccant regenerator 626, provide for cooling of the regenerated desiccant, before it is directed back into circulation loop 640. That is, in general, desiccant regeneration steps conducted in a regenerator 626 result in heating of the desiccant. Heat exchanger 660 merely adds efficiency, by using the relatively cold temperature of desiccant in line 651 immediately from contactor 604, to cool fluid in line 652, as it leaves desiccant regenerator 626.

Chiller system 606 is provided with cold fluid via circulation line 661 and vapor compression chiller 662. Vapor compression chiller 662 would be powered, for example, by electrical power generated at the combustion turbine 609 (generator 665) or the heat recovery steam generator system 612. Fluid for cooling operations conducted in a vapor compression chiller 662 is provided via circulation loop 663 from absorption chiller 631.

Figure 1:
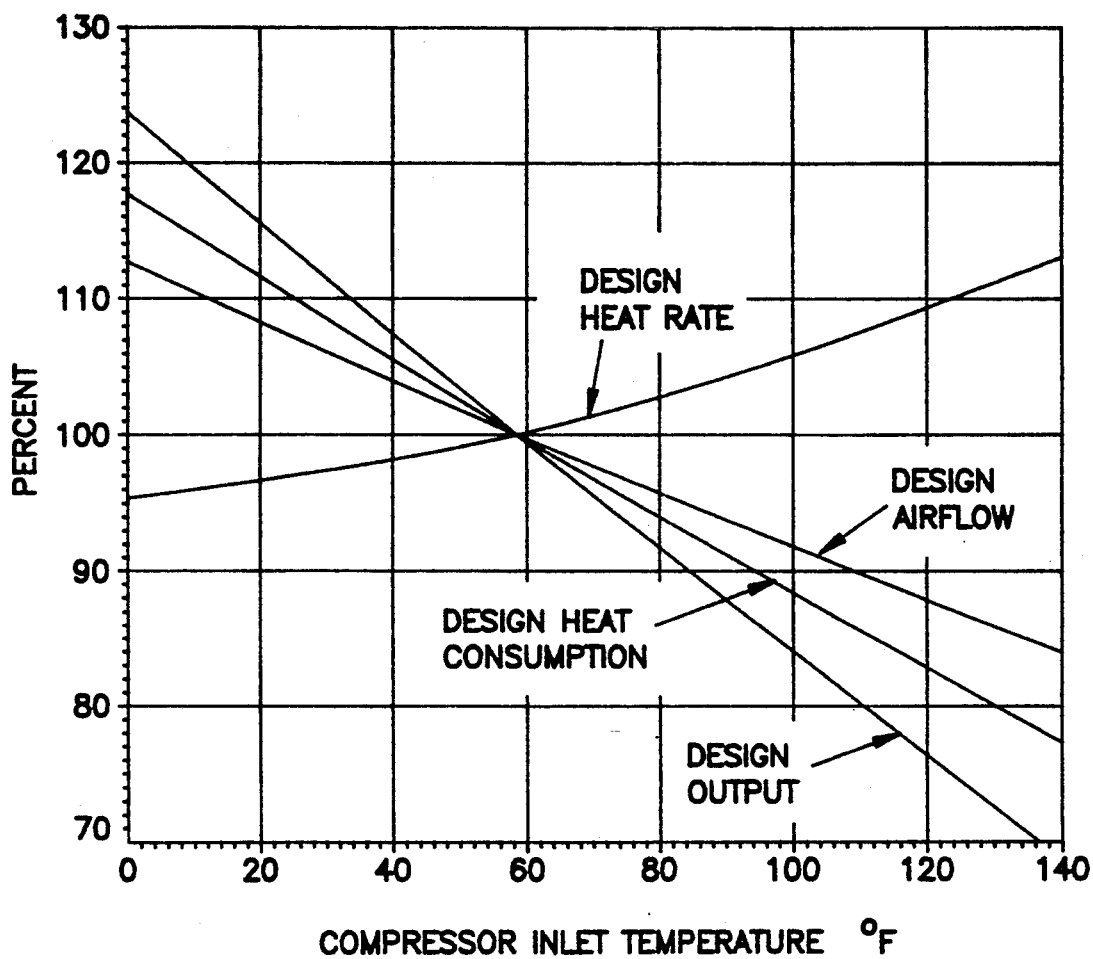
FIG. 1 is a percent performance plot versus compressor inlet temperature for a General Electric model MS7001 turbine, rated for an air flow of about 3,255,000 lbs of air per hour at 100% design air flow, and production of 145 MW power output.

Now that the general flow scheme for the system of FIG. 12 has been presented, operations discussion will be provided to facilitate understanding of applications of the present invention. Consider for example, a system wherein combustion turbine 609 is a General Electric model MS7001 rated for 145,400 KW output (100% design output), at compressor inlet temperatures of 59° F., as reflected in FIG. 1. Consider further such a system wherein the associated generator 665 is rated for a maximum operation with an input of about 173,300 KW of power. Thus, what is desired, For the General Electric model MS7001 system, this corresponds to a percent of design output of about 119.2%, (123.5% less estimated losses due to inlet and exhaust pressure drops of 4" and 25" of water respectively). From the curve of FIG. 1, it can be estimated that this requires air to the compressor inlet at about 0° F.

According to the principles of the present invention, then, it will be desired to deliver the air to the combustion turbine 609, FIG. 12, at a temperature of 0° F. The relative humidity that is desired, can be calculated according to the previously described principle of providing the air with a humidity content generally no greater than would result in saturation, if the air were about 5° F. cooler. Referring to the psychrometric chart of FIG. 2, air at about −5° F. (0° F.–5° F.) is saturated at a water content of about 4 grains of moisture per pound dry air, which corresponds to relatively humidity of about 80% at 0° F. Thus, it will be desired to provide the air in line 510 to combustion turbine 509 at about 0° F. and no greater than about 80% relative humidity. In general, according to preferred applications of the present invention, it will not be desirable to provide the relative humidity significantly lower than the upper most design limit acceptable, as reducing humidity takes up energy.

Referring to the process of FIG. 12, it is foreseen that water spray dehumidifier 602 can be operated to convert ambient temperature air to cooled saturated air at about 50° F. In general, liquid desiccant contactor 604 will not be operated to reduce the temperature of the air any further, but merely to reduce humidity. Thus, air from line 605, fed into chiller system 606, will generally be at 50° F., and system 606 should be operated to reduce the temperature from about 50° F. to about 0° F. The psychrometric chart of table 2 can be utilized to calculate the uppermost acceptable relative humidity for air in line 605. More specifically, the air in line 610 is to be at 0° F. and 80% relative humidity. The liquid desiccant contactor 604, operated with desiccant cooled by absorption chiller 641 to 42° F., is limited in its ability to remove moisture. A reasonable minimum moisture content of air in line 605 will be 10 grains. Such air has an enthalpy of 13.6 BTU/lb. Chiller system 606 must then cool the air to 0° F. and 80% relative humidity. This is a moisture content of 4 grains.

In general, chiller 606 may be of a plurality of types, powered by a vapor compression chiller 662. A first type would be through utilization of a coil arrangement, as previously described for other figures. A second system, would involve a direct spray of very cold fluid cooled by vapor compression chiller 662, into the air. Such a direct spray system would preferably be a liquid desiccant contactor system, so as to avoid the provision of saturated air in line 610. From the above calculations, at which it was indicated that system 604 operating through utilization of absorption chiller 641 could only accomplish, at a minimum, a moisture content of about 10 grains; and, since it was calculated that a moisture content of about 4 grains would be desired at 0° F., for air in line 510, preferably chiller system 606 comprises a liquid desiccant contactor provided with a very cold liquid desiccant fluid spray, chilled by means of vapor compression chiller 662. Thus the spray can both chill and dehumidify air from line 605.

Fully designing the system, and calculating energy inputs etc. requires selection of a design point. A convenient design point is to consider operation of the system when the ambient air is at 95° F. and 64% relative humidity. For the General Electric model MS7001 turbine, 95° F. air corresponds to a percent of design air flow of about 93%. The 100% design air flow for the MS7001 is 3,255,000 lbs per hour. Thus, the utilization of 95° F. air would be associated with an air flow of 3,027,000 lbs per hour. The intent of the above described system, however, the chart of table 1 it can be seen that this corresponds to a percent of design air flow of 112.5%. This means that the air flow needed for operation of the combustion turbine 509 as planned, via line 510, is 3,621,000 lbs per hour.

The cooling effort that will be required to achieve the production of 3,621,000 lbs per hour of air at 0° F. and 80% relative humidity, from ambient air at 95° F. and 64% relative humidity, can be estimated as follows. First, consider the step of cooling conducted in the water spray dehumidifier 602, by means of absorption chiller 531. This is a modification in the condition of the air from 95° F., 64% relative humidity to 50° F., saturated. From the pyschrometric chart it can be determined that air having a temperature of 95° F. and 64% relative humidity has an enthalpy (BTU/lb of air) of 48.2. Air at 50° F., 100% relative humidity, has an enthalpy of 20.2 BTU per lb. Thus, what is necessary is to generate (48.2–20.2 BTU per lb) times 3,621,000 lbs per hour or 101.4 MBTU per hour of energy. In this field, energy is often stated in tons, a ton being the amount of heat required to melt a ton of ice in an hour. This corresponds to about 12,000 BTU per hour (per ton), so the energy output necessary for the absorption chiller 631 in order to accommodate operation of the water spray dehumidifier 602 is about 8,449 tons.

In addition to operating the water spray dehumidifier, however, absorption chiller 631 of FIG. 12 needs to accommodate the cooling load for fluid in circulation loop 662 from the vapor compression chiller 661. Under the system proposed, the vapor compression chiller 662 is to be operated to reduce the temperature of air at 50° F., 20% relative humidity, to an air temperature of 0° F. From psychrometric charts such as that shown in FIG. 2, it can be determined that the enthalpy of air at 50° F., 20% relative humidity, is 13.6 BTU per lb. It can also be calculated that air having a temperature of 0° F., 80% relative humidity, has an enthalpy of about 0.5 BTU per lb. Thus, the heat load for the vapor compression chiller 662 is about (13.6–0.5 BTU per lb) times 3,621,000 lbs per hour or 47.4 MBTU/hour or 3,953 tons. The total cooling effect required for absorption chiller 631, then, is 8449 plus 3953 or 12402 tons.

Absorption chiller 641 is responsible for cooling the desiccant utilized in the operation of liquid desiccant contactor 604. Liquid desiccant contactor 604 is operated to convert saturated air of 50° F., to air at 50° F., 20% relative humidity. From psychrometric charts such as that shown in FIG. 1, it can be determined that the enthalpy of air at about 50° F. and 100% relative humidity is 20.2 BTU per lb and the enthalpy of air at 50° F., 20% relative humidity is about 13.6 BTU per lb. The energy demand on absorption chiller 641, therefore, with respect to operation of liquid desiccant contactor 604 is about (20.2 −13.6) times 3,621,000 or 23.9 MBTU per hour. This corresponds to about 1992 tons.

In addition, absorption chiller 641 is responsible for cooling regenerated desiccant returning from desiccant regenerator 626 via line 551. It is anticipated that through the utilization of a heat exchanger 652, regenerated desiccant solution can be returned to absorption chiller 641 at a temperature of about 5° F. higher than it was bled to the desiccant regenerator. The amount of energy required to reduce the temperature of an aqueous solution of about 5° F. is about 150 ton. Thus, the total requirement for absorption chiller 541 is about 1992 plus 50 or 2142 tons.

For the system referred to above, then, the total amount of energy associated with absorption cooling is about 12402 plus 2142 or 14,544 tons; and, a total amount of energy associated with electric cooling via the vapor compression chiller is about 3953 tons. (The figure of 3853 tons must be handled by this system twice, since it needs to be removed from the air at chiller system 606 by the vapor compression chiller 661, and then it needs to be removed from the vapor compression chiller 661 by the absorption chiller 631.)

It is noted that the cooling equipment, i.e. the absorption cooling system and the vapor compression cooling system, will have power consumption requirements for operation. For example, the fans and pumps of the absorption cooling systems may be expected to require about 0.25 KW per ton, making an energy demand of about 0.25 KW/ton times 14,544 tons or 3.6 MW. The power consumption for the vapor compression system can be expected to be about 0.76 KW per ton, for operation of fans, pumps and compressors. Since 3953 tons of cooling are required, approximately 3.0 MW of energy will be necessary for the vapor compression chiller 561. This means the total electrical power consumed by the equipment would be about 6.6 MW. The power consumption estimates of 0.25 KW/ton (absorption cooler) and 0.76 KW/ton (vapor compression) were estimated from manufacturers, data for conventional absorber and vapor compression systems, scaled up for use as described herein.

Thus, in improving performance of the combustion turbine from about 120.7 MW (at inlet of 95° F.) to about 173.3 MW (at inlet of 0° F.) one utilized only about 6.6 MW of the extra energy. It is apparent that a substantial increase in power production of the system has therefore resulted.

It will be apparent from the above-description, and reference to FIG. 12, that advantage to the above system is not merely that only a relative small amount of electrical energy input is necessary to obtain substantial increase in production of power, but also that the energy of the system is very efficiently utilized. In particular, the system provides for a utilization of nearly all utilizable heat in the off-gases from the gas turbine 509.

In addition, it should be understood that as the amount of air moved into and through combustion turbine 609, per hour, is increased, the temperature of air coming therefrom, via line 611, increases. It is foreseen that for operation of the system as above described, with the movement of about 3,621,000 lbs of air per hour through turbine 609, when the turbine is General Electric MS7001, the temperature of the air in line 611 will be above about 1,020° F. This means that substantial heat recovery can be obtained in the heat recovery steam generated at 612 without the need for utilization of fuel thereat, to heat the air sufficiently for good electrical power generation (i.e. steam turbine operation). Increased efficiency results, from this fuel savings.

An additional advantage of the system results from cooling the turbine exhaust to low temperatures (near 150–200° F.) from the stack gas coolers. Since the gas is so much colder than at the turbine expander outlet, it has substantially less volume. In flowing through the heat recovery steam generator, the gas has a pressure drop of 25" water gauge or more. This pressure drop exits as a back pressure on the turbine expander. Such a back pressure on a turbine expander can cause about a 3.25% reduction in power output, and a 3.2% loss in efficiency (increase in heat rate).

At the lower temperatures, as a result of cooling from the stack gas cooler and regenerator, the gas leaving occupies a smaller volume and can be pumped through a 25" water gauge pressure drop, with an electrically driven fan. The fan will use less power than the turbine would otherwise lose due to the back pressure. A gain of about 1 megawatt in that output result, with no increase in fuel consumption.

Alternately stated, the downstream equipment comprising heat recovery steam generator 612, and stack gas cooler system 616, can be operated very efficiently in systems applied according to the present invention, since relatively high temperature off-gases from the gas turbine 609 can be provided, and low temperature from cooling results.

Figure 13:
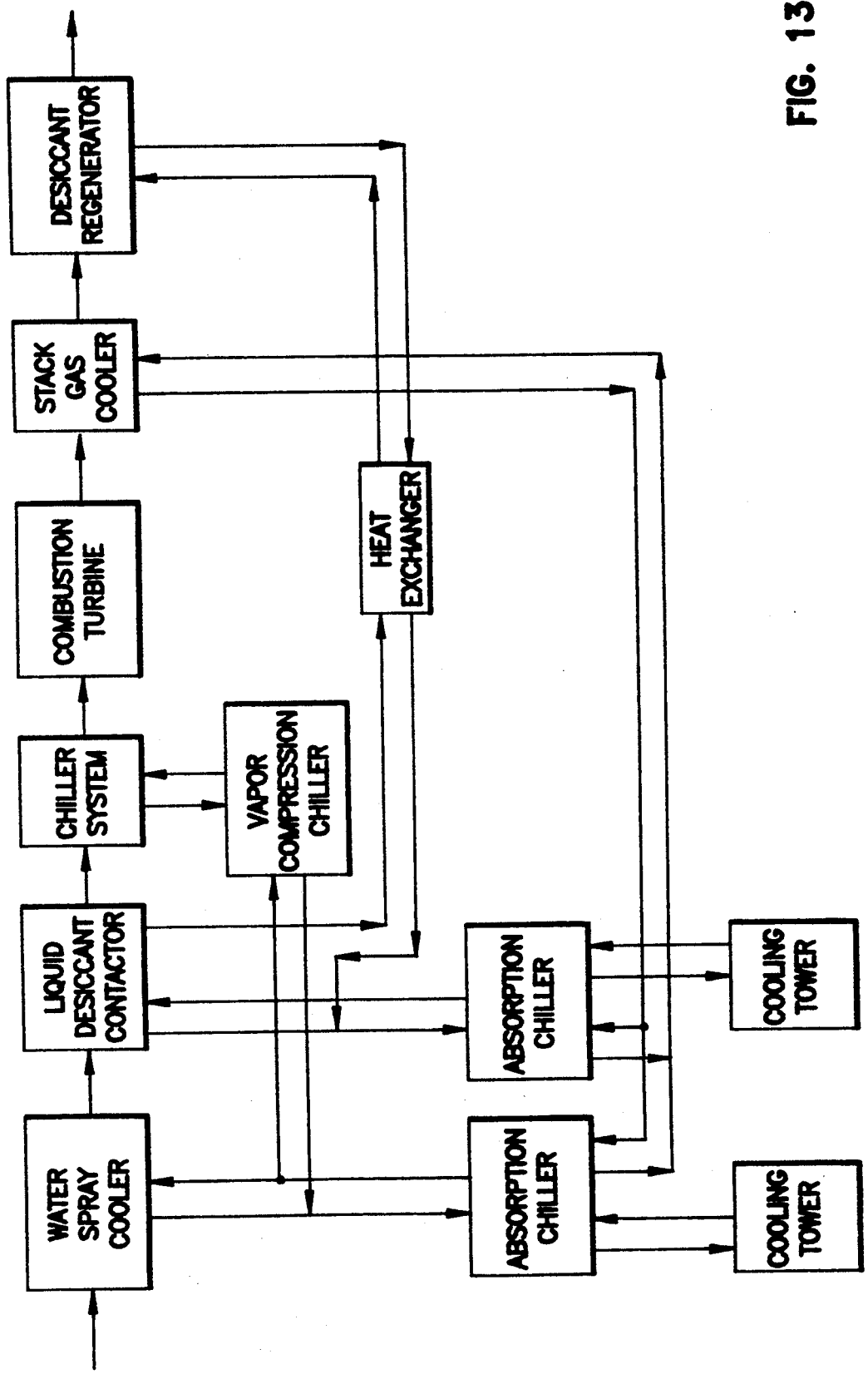
FIG. 13 is a schematic representation of an alternate power plant system, to that illustrated in FIG. 12.

It is, however, foreseen that the principles of the present invention may be applied in systems wherein a heat recovery steam generator is not utilized, downstream from the gas turbine system. An example of such an arrangement is illustrated in FIG. 13. FIG. 13 differs from FIG. 12, principally in that off-gases from the gas turbine are directed immediately into the stack gas cooler system, and are not first passed through heat recovery steam generator system for production of power. Such a system will nevertheless be advantageous, and for only relatively small input of electrical energy one can obtain substantially improved operation of the combustion turbine and hence power production.

Utilization of a Low Temperature Liquid Desiccant Cooler

As previously explained with respect to FIGS. 12 and 13, the chiller system immediately upstream from the combustion turbine, provided with cold fluid via vapor compression chiller, can be a cooling coil system, or it can be a system wherein a spray of very cold liquid desiccant is directed into the air flow stream, for example from line 605 FIG. 12, to achieve both reduction and temperature and reduction in moisture content. It is foreseen that in many applications the latter system will be desired, for a variety of reasons.

First, as demonstrated with respect to hypothetical example provided above, in some instances it will be desirable to reduce the temperature of air directed into the combustion turbine to a very low point. The point could be so low, that a liquid desiccant contactor provided with cold fluid by means of an absorption chiller, cannot achieve an appropriately low relative humidity or absolute moisture content, for the resulting, chilled, air in line 610 (FIG. 12) to have a sufficiently low moisture content be desirable for direction into the combustion turbine 609. That is, the follow-up step of cooling with the vapor compression chiller may need to be associated with further dehumidification.

Even if the vapor compression chiller temperature reduction was not to be associated with further dehumidification, it may still be desirable to avoid internal coils etc. in chiller system 606, FIG. 12. A reason for this is that the provision of such equipment in the air flow line would tend to increase the inlet pressure drop to the combustion turbine 609, decreasing efficiency. That is, the fan directing air into combustion turbine 609 would need to work harder, to overcome restrictions to air flow provided by the coils in chiller system 606.

In addition, the provision of equipment such as chiller coils in the air flow stream may be associated with problems from deterioration, etc., during equipment lifetime. This could, for example, result in small particles of metal etc. being directed into the combustion turbine 609.

In any event, some systems may use a chiller coil arrangement in the chiller arrangement 606 of FIG. 12, and in others it may be preferred to utilize a second liquid desiccant contactor arrangement as chiller systems 606, with very cold liquid desiccant solution provided by means of vapor compression chiller 662. Such a system could be operated generally analogously to those spray systems described with respect to FIGS. 11 and 14, wherein a spray of very cold liquid desiccant solution is directed into the air stream, in this instance at a sufficiently low temperature to provide both cooling and dehumidification.

Figure 15:
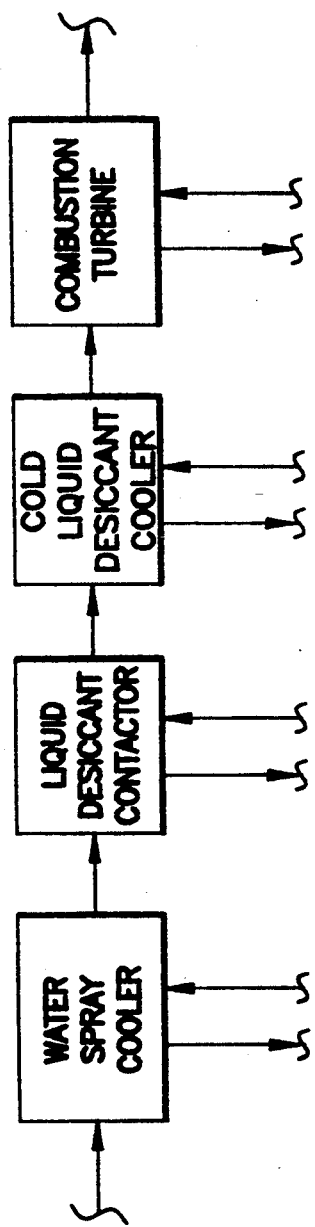
FIG. 15 is a partial schematic representation of an alternate system for conditioning inlet air to a gas turbine system, to those illustrated in the previous schematics.

Attention is specifically directed to FIG. 15, with respect to such an arrangement. In FIG. 15 a schematic arrangement is depicted, illustrating water directed through a first water spray cooler, analogous to water spray cooler 602 of FIG. 12, a liquid desiccant contactor, analogous to liquid desiccant contactor 604, FIG. 12, a cold liquid desiccant cooler, provided in the position of chiller system 606, FIG. 12, and eventually into a combustion turbine analogous to combustion turbine 609, FIG. 12. The schematic of FIG. 15 is fragmentary, and portions not shown may be as illustrated in FIG. 12 for the arrangement depicted therein. What is significant about FIG. 15, again, it is that a cold liquid desiccant cooler or spray system is depicted upstream from the combustion turbine and downstream from the first desiccant contactor. This system is utilized in place of a coil system, such as previously described with respect to FIGS. 3 and 4.

From the above-general presentations, applications of principles according to the present invention will be generally understood. The invention is not, however, to be specifically limited to the particular applications, systems, and/or parameters provided herein, except as provided by the following claims.

What is claimed and desired to be secured by letters patent is as follows:

1. A method for providing relatively efficient operation of an air compressor arrangement; said method including the steps of:
   (a) providing an ambient air flow stream from ambient air having as temperature of at least 70° F. and a relative humidity of at least 60%; and
   (b) conditioning the ambient air flow stream to provide an air flow stream to the air compressor arrangement at a first temperature of no greater than about 55° F. and at a relative humidity such that the moisture content of the air in the air flow stream is no greater than an amount corresponding to saturation at a temperature of 5° F. lower than the first temperature.

2. A method according to claim 1 wherein:
   (a) the steps of conditioning the ambient air includes the steps of:
      (i) reducing the temperature of the ambient air to no greater than about 55° F. by a first step of spraying cold fluid thereinto, to provide a cold air stream; and,
      (ii) reducing the moisture content of the cold air stream by spraying a liquid desiccant solution therein and separating a resulting liquid phase from a resulting gaseous phase, to form a resulting gaseous phase having a moisture content therein of no greater than an amount corresponding to saturation at a temperature of 5° F. lower than a temperature of the separated gaseous phase.

3. A method according to claim 2 including a step of:
   (a) conducting a second reduction of temperature by reducing the temperature of the separated gaseous phase, from the step of reducing moisture content by spraying liquid desiccant, by a further step of directing the separated gaseous phase through a second cold desiccant spray of a downstream chiller arrangement;
      (i) said step of conducting a second reduction of temperature being conducted to form a gas stream therefrom having a temperature and relative humidity content such that the moisture content of the air in the air flow stream is no greater than an amount corresponding to saturation of a temperature of 5° F. lower than the temperature of the gas stream from the second reduction of temperature.

4. A method according to claim 3 including a step of conducting the second reduction of temperature with a second cold desiccant spray chilled by means of a vapor compression chiller system.

5. A method according to clam 2 including a step of:
   (a) conducting a second reduction of temperature by reducing the temperature of the separated gaseous phase from the step of reducing moisture content by spraying liquid desiccant, by a further step of directing the separated gaseous phase through a heat exchange coil arrangement of a downstream chiller arrangement;
      (i) said step of conducting a second reduction of temperature being conducted to form a gas stream therefrom having a temperature and relative humidity content such that the moisture content of the air in the air flow stream is no greater than an amount corresponding to saturation at a temperature of 5° F. lower than the temperature of the gas stream from the second reduction of temperature.

6. A method according to claim 5 including a step of conducting the second reduction of temperature by passing the resulting gaseous phase through a heat exchange coil arrangement of a vapor compression chiller system.

7. A method according to claim 6 wherein said step of conducting a second reduction of temperature is conducted sufficiently to reduce the temperature of the separated gaseous phase to no greater than about 40° F.

8. A method according to claim 6 wherein said step of conducting a second reduction of temperature is conducted sufficiently to reduce the temperature of the separated gaseous phase to no greater than about 20° F.

9. A method according to claim 2 including a step of generating the cold fluid, for the step of spraying cold fluid, by operation of an absorption chiller arrangement.

10. A method according to claim 9 wherein said step of spraying liquid desiccant includes spraying a cold liquid desiccant solution chilled by operation of an absorption chiller arrangement.

* * * * *

UNITED STATES PATENT AND TRADEMARK OFFICE
CERTIFICATE OF CORRECTION

PATENT NO. : 5,203,161
DATED : April 20, 1993
INVENTOR(S) : John M. Lehto It is certified that error appears in the above-identified patent and that said Letters Patent is hereby corrected as shown below:

Column 25, line 5, insert --is to operate the gas turbine to provide 173,300 KW output.-- after the word "desired".

Column 26, line 11, insert --is to provide air to the combustion turbine at 0°F. From-- after the word "however".

Column 27, line 36, "manufacturers," should read --manufacturers'--.

Signed and Sealed this

Eighteenth Day of January, 1994

Attest:

BRUCE LEHMAN

*Attesting Officer*     *Commissioner of Patents and Trademarks*